US008556716B2

(12) United States Patent
Sakakibara et al.

(10) Patent No.: US 8,556,716 B2
(45) Date of Patent: Oct. 15, 2013

(54) IMAGE GENERATION SYSTEM, IMAGE GENERATION METHOD, AND INFORMATION STORAGE MEDIUM

(75) Inventors: Tadashi Sakakibara, Tokyo (JP); Kentaro Yamaguchi, Yokohama (JP); Taketoshi Inagaki, Fujisawa (JP); Akio Onda, Warabi (JP)

(73) Assignee: Namco Bandai Games Inc., Tokyo (JP)

( * ) Notice: Subject to any disclaimer, the term of this patent is extended or adjusted under 35 U.S.C. 154(b) by 172 days.

(21) Appl. No.: 13/020,522

(22) Filed: Feb. 3, 2011

(65) Prior Publication Data

US 2011/0244956 A1     Oct. 6, 2011

(30) Foreign Application Priority Data

Mar. 31, 2010   (JP) ................... 2010-083892

(51) Int. Cl.
*A63F 9/24*           (2006.01)
(52) U.S. Cl.
USPC ............................................. 463/33; 463/31
(58) Field of Classification Search
USPC ....................................... 463/31, 33
See application file for complete search history.

(56) References Cited

U.S. PATENT DOCUMENTS

| | | | |
|---|---|---|---|
| 5,616,078 A * | 4/1997 | Oh ..................................... | 463/8 |
| 2004/0219980 A1 | 11/2004 | Bassett et al. | |
| 2005/0059488 A1 | 3/2005 | Larsen et al. | |
| 2010/0060575 A1 | 3/2010 | Ohta | |
| 2012/0113004 A1 | 5/2012 | Ohta | |

FOREIGN PATENT DOCUMENTS

| | | |
|---|---|---|
| EP | 1 279 425 A2 | 1/2003 |
| EP | 2 131 266 A2 | 12/2009 |
| EP | 2 359 916 A1 | 8/2011 |
| JP | A-2000-20193 | 1/2000 |
| JP | A-2006-087600 | 4/2006 |
| JP | A-2007-004732 | 1/2007 |
| JP | A-2008-136695 | 6/2008 |
| JP | A-2010-61545 | 3/2010 |
| WO | WO 99/35633 | 7/1999 |

OTHER PUBLICATIONS

May 16, 2013 Partial European Search Report issued in Application No. EP 11 5 3982.

* cited by examiner

*Primary Examiner* — Corbett B Coburn
(74) *Attorney, Agent, or Firm* — Oliff & Berridge, PLC

(57) ABSTRACT

An image generation system includes an image information acquisition section that acquires image information from an image sensor. The image generation system further includes an information acquisition section that acquires position information about a player relative to a display section that displays an image or the image sensor based on the image information. The image generation system further includes a virtual camera control section that controls at least one of a distance between a character corresponding to the player and a virtual camera in a depth direction, a distance between the character and the virtual camera in a height direction, a distance between the character and the virtual camera in a transverse direction, and an angle of view of the virtual camera, based on the position information about the player acquired by the information acquisition section. The image generation system further includes an image generation section that generates an image viewed from the virtual camera in an object space.

23 Claims, 27 Drawing Sheets

COLOR IMAGE INFORMATION

DEPTH INFORMATION

DEPTH INFORMATION

SKELETON INFORMATION

COLOR IMAGE INFORMATION

DEPTH INFORMATION

DEPTH INFORMATION AND COLOR IMAGE INFORMATION

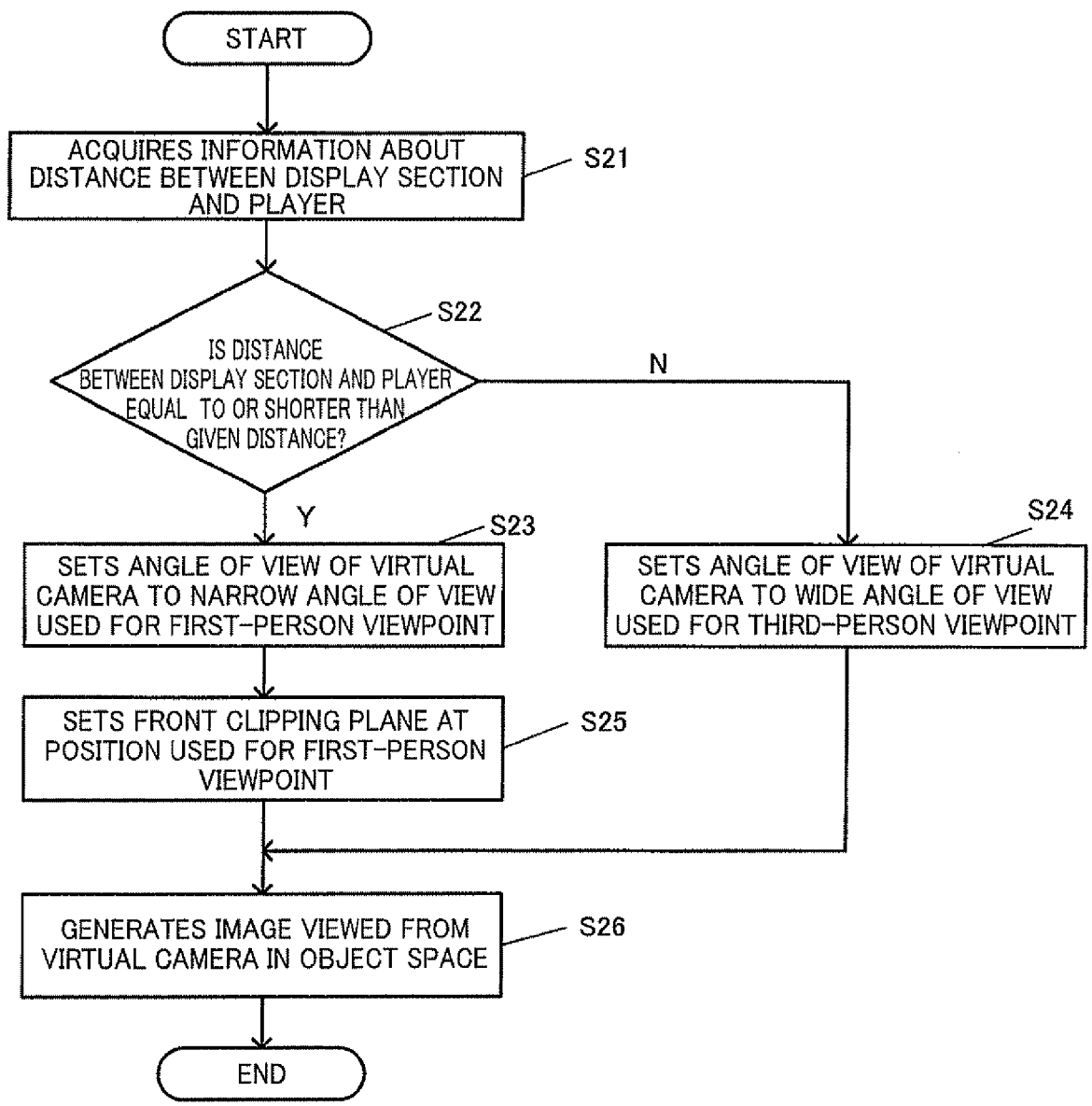

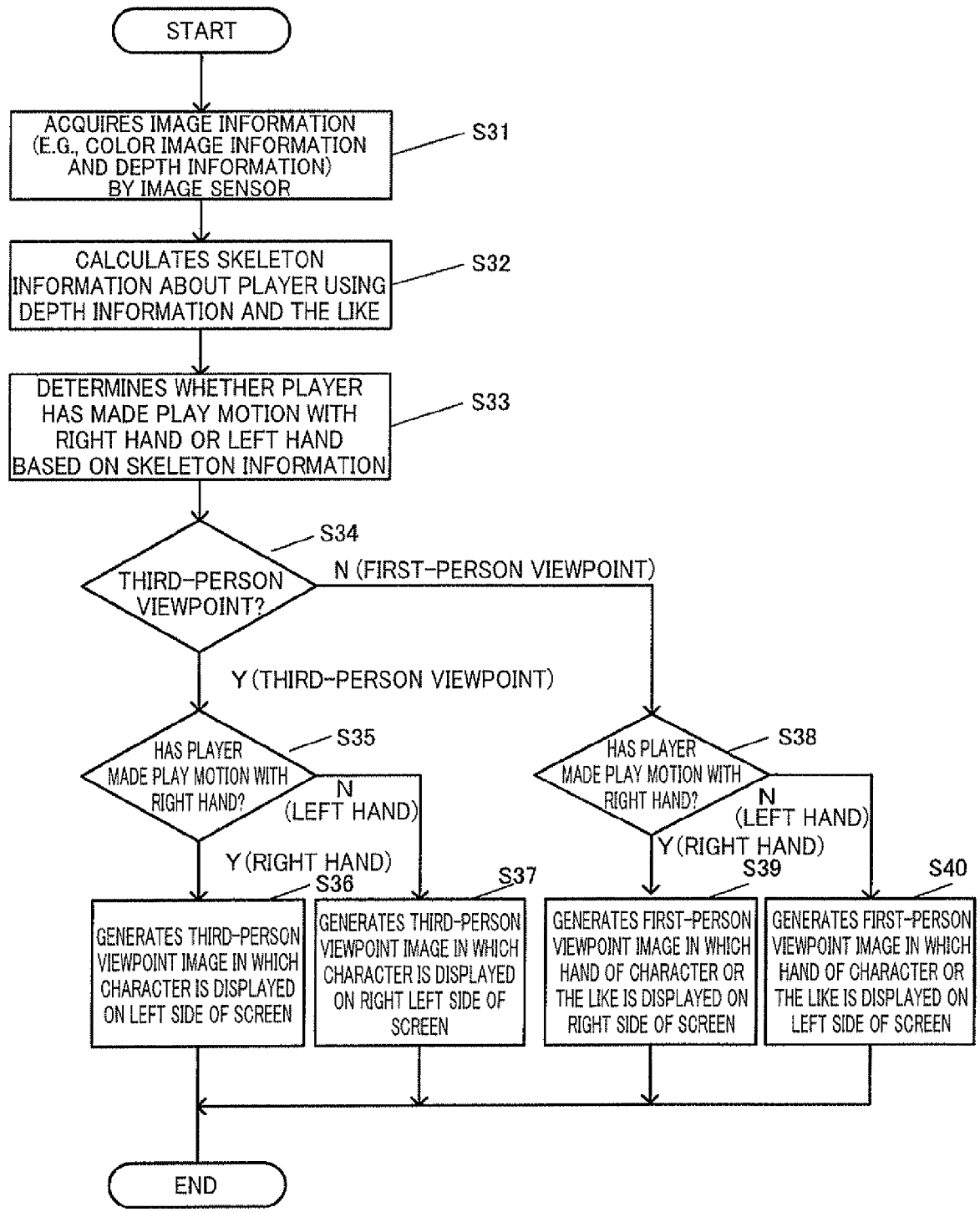

IMAGE GENERATION SYSTEM, IMAGE GENERATION METHOD, AND INFORMATION STORAGE MEDIUM

Japanese Patent Application No 2010-083892 filed on Mar. 31, 2010, is hereby incorporated by reference in its entirety.

BACKGROUND

The present invention relates to an image generation system, an image generation method, an information storage medium, and the like.

A game device that allows the player to perform a game operation using a game controller provided with a motion sensor instead of a game controller provided with an operation button and a direction key, has been popular in recent years. A game device having such an operation interface allows the player to perform an intuitive operation input, and can simplify game operations, for example. JP-A-2008-136695 discloses a related-art game device that enables such an intuitive interface, for example.

However, when using a game controller provided with a motion sensor, the player cannot perform a game operation using an arbitrary thing (object) held by the player, or the hand or the body of the player. Therefore, the player may not be fully involved in virtual reality.

When implementing a three-dimensional game, it is important to set the viewpoint of a virtual camera corresponding to the viewpoint of the player. The virtual camera may be set to a third-person viewpoint, a first-person viewpoint, or the like. When the virtual camera is set to a third-person viewpoint, the virtual camera is set behind a character, and a different image is observed depending on the distance between the character and the virtual camera.

However, a related-art virtual camera viewpoint setting method cannot be directly used when implementing an operation interface that does not utilize a game controller, for example.

SUMMARY

According to one aspect of the invention, there is provided an image generation system comprising:

an image information acquisition section that acquires image information from an image sensor;

an information acquisition section that acquires position information about a player relative to a display section that displays an image or the image sensor based on the image information;

a virtual camera control section that controls at least one of a distance between a character corresponding to the player and a virtual camera in a depth direction, a distance between the character and the virtual camera in a height direction, a distance between the character and the virtual camera in a transverse direction, and an angle of view of the virtual camera, based on the position information about the player acquired by the information acquisition section; and an image generation section that generates an image viewed from the virtual camera in an object space.

According to another aspect of the invention, there is provided an image generation system comprising:

an information acquisition section that acquires information about a distance between a display section that displays an image and a player;

a virtual camera control section that controls a virtual camera; and an image generation section that generates an image viewed from the virtual camera in an object space, the virtual camera control section increasing a distance between a character corresponding to the player and the virtual camera in a depth direction, or increasing an angle of view of the virtual camera, as the distance between the display section and the player increases.

According to another aspect of the invention, there is provided an image generation system comprising:

an information acquisition section that acquires information about a distance between a display section that displays an image and a player;

a virtual camera control section that controls a virtual camera; and an image generation section that generates an image viewed from the virtual camera in an object space, the virtual camera control section setting the virtual camera to a first-person viewpoint when the distance between the display section and the player is short, and setting the virtual camera to a third-person viewpoint when the distance between the display section and the player is long.

According to another aspect of the invention, there is provided an image generation method comprising:

acquiring image information from an image sensor;

acquiring position information about a player relative to a display section that displays an image or the image sensor based on the image information;

controlling at least one of a distance between a character corresponding to the player and a virtual camera in a depth direction, a distance between the character and the virtual camera in a height direction, a distance between the character and the virtual camera in a transverse direction, and an angle of view of the virtual camera, based on the position information about the player; and generating an image viewed from the virtual camera in an object space.

According to another aspect of the invention, there is provided an image generation method comprising:

acquiring information about a distance between a display section that displays an image and a player;

controlling a virtual camera;

generating an image viewed from the virtual camera in an object space; and increasing a distance between a character corresponding to the player and the virtual camera in a depth direction, or increasing an angle of view of the virtual camera, as the distance between the display section and the player increases.

According to another aspect of the invention, there is provided an image generation method comprising:

acquiring information about a distance between a display section that displays an image and a player;

controlling a virtual camera;

generating an image viewed from the virtual camera in an object space; and setting the virtual camera to a first-person viewpoint when the distance between the display section and the player is short, and setting the virtual camera to a third-person viewpoint when the distance between the display section and the player is long.

According to another aspect of the invention, there is provided a computer-readable information storage medium storing a program that causes a computer to execute the above image generation method.

BRIEF DESCRIPTION OF THE DRAWINGS

FIG. 26 is a flowchart illustrative of a process according to one embodiment of the invention.

FIG. 27 is a flowchart illustrative of a process according to one embodiment of the invention.

DESCRIPTION OF EXEMPLARY EMBODIMENTS

Figure 1:
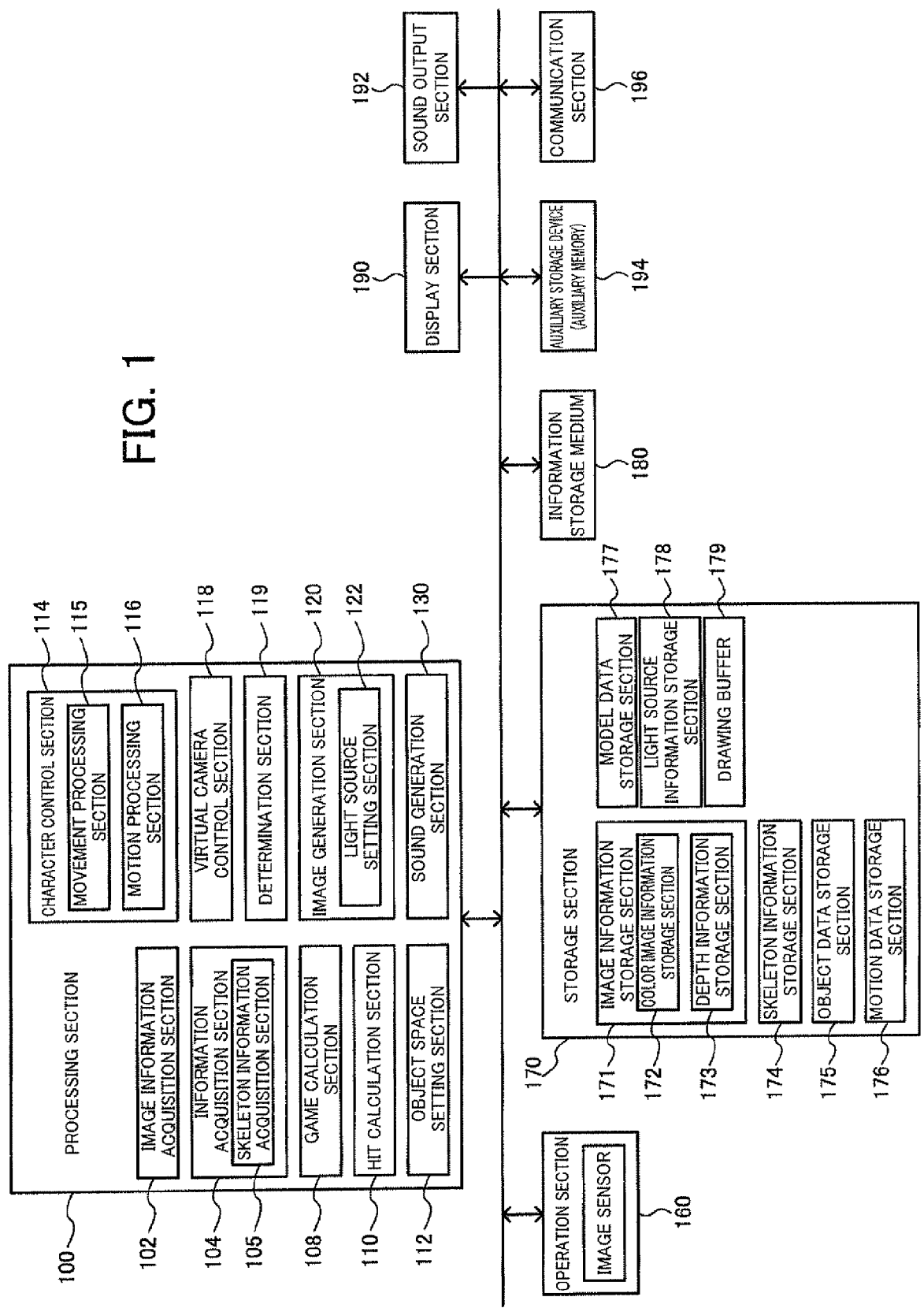
FIG. 1 shows a configuration example of an image generation system according to one embodiment of the invention.

Several aspects of the invention may provide an image generation system, an image generation method, an information storage medium, and the like that can implement a novel virtual camera viewpoint setting method.

According to one embodiment of the invention, there is provided an image generation system comprising:

an image information acquisition section that acquires image information from an image sensor;

an information acquisition section that acquires position information about a player relative to a display section that displays an image or the image sensor based on the image information;

a virtual camera control section that controls at least one of a distance between a character corresponding to the player and a virtual camera in a depth direction, a distance between the character and the virtual camera in a height direction, a distance between the character and the virtual camera in a transverse direction, and an angle of view of the virtual camera, based on the position information about the player acquired by the information acquisition section; and an image generation section that generates an image viewed from the virtual camera in an object space.

According to this embodiment, the position information about the player is acquired based on the image information from the image sensor. At least one of the distance between the character and the virtual camera in the depth direction, the distance between the character and the virtual camera in the height direction, the distance between the character and the virtual camera in the transverse direction, and the angle of view of the virtual camera, is controlled based on the position information about the player, and an image viewed from the virtual camera in the object space is generated. This makes it possible to generate an image while reflecting the position information about the player acquired based on the image information from the image sensor in the distance between the character and the virtual camera in the depth direction, the height direction, or the transverse direction, or the angle of view of the virtual camera. Therefore, the relative positional relationship between the character and the virtual camera and the like can be changed depending on the motion of the player and the like, so that a novel virtual camera viewpoint setting method can be implemented.

In the image generation system, the virtual camera control section may increase the distance between the character and the virtual camera in the depth direction as a distance between the display section or the image sensor and the player increases.

According to this feature, the virtual camera moves away from the character in the depth direction when the player has moved away from the display section or the image sensor. This makes it possible to implement a novel virtual camera viewpoint setting method.

In the image generation system, the virtual camera control section may increase the distance between the character and the virtual camera in the height direction as a distance between the display section or the image sensor and the player increases.

According to this feature, the virtual camera moves upward relative to the character when the player has moved away from the display section or the image sensor. This makes it possible to implement a novel virtual camera viewpoint setting method.

In the image generation system, the virtual camera control section may increase the angle of view of the virtual camera as a distance between the display section or the image sensor and the player increases.

According to this feature, the angle of view of the virtual camera increases when the player has moved away from the display section or the image sensor, so that a zoom-out image is generated, for example.

In the image generation system, the virtual camera control section may move the virtual camera when the player has moved in one of a leftward direction and a rightward direction relative to the display section or the image sensor, the virtual camera being moved in the other of the leftward direction and the rightward direction relative to the character.

According to this feature, the virtual camera moves in a different direction relative to the character when the player has moved in the transverse direction relative to the display section or the image sensor. This makes it possible to generate an image based on novel viewpoint control.

In the image generation system, the virtual camera control section may set the virtual camera to a first-person viewpoint when a distance between the display section or the image sensor and the player is short, and may set the virtual camera to a third-person viewpoint when the distance between the display section or the image sensor and the player is long.

According to this feature, the viewpoint is switched between a first-person viewpoint and a third-person viewpoint based on the distance between the display section or the image sensor and the player. This makes it possible to provide an operation interface environment that is intuitive and convenient for the player.

In the image generation system, the image generation section may perform a clipping process that excludes at least part of the character from a drawing target when the virtual camera has been set to the first-person viewpoint by controlling the angle of view of the virtual camera.

According to this feature, an appropriate first-person viewpoint image can be generated when the viewpoint is set to a first-person viewpoint by controlling the angle of view of the virtual camera.

In the image generation system, the image information acquisition section may acquire depth information as the image information from the image sensor, a depth value being set to each pixel position of the depth information; and the information acquisition section may acquire the position information about the player based on the depth information.

According to this feature, the position information about the player viewed from the display section or the image sensor can be efficiently acquired by a simple process.

The image generation system may further comprise: a determination section that determines whether the player has made a play motion with a right hand or a left hand, the image generation section may generate a different image based on whether the player has made the play motion with the right hand or the left hand.

According to this feature, an appropriate image can be generated based on whether the player has made a play motion with the right hand or the left hand.

In the image generation system, the information acquisition section may acquire skeleton information that specifies a motion of the player viewed from the image sensor based on the image information from the image sensor; and the determination section may determine whether the player has made the play motion with the right hand or the left hand based on the skeleton information.

According to this feature, whether the player has made a play motion with the right hand or the left hand can be determined by effectively utilizing the skeleton information.

In the image generation system, the image generation section may generate an image in which the character is displayed on a left side of a screen of the display section when the determination section has determined that the player has made the play motion with the right hand when the virtual camera is set to a third-person viewpoint, and may generate an image in which the character is displayed on a right side of the screen of the display section when the determination section has determined that the player has made the play motion with the left hand when the virtual camera is set to the third-person viewpoint.

According to this feature, an appropriate third-person viewpoint image can be generated based on whether the player has made a play motion with the right hand or the left hand. This makes it possible for the player to easily play the game, for example.

In the image generation system, the image generation section may generate an image in which part of the character is displayed on a right side of a screen of the display section when the determination section has determined that the player has made the play motion with the right hand when the virtual camera is set to a first-person viewpoint, and may generate an image in which part of the character is displayed on a left side of the screen of the display section when the determination section has determined that the player has made the play motion with the left hand when the virtual camera is set to the first-person viewpoint.

According to this feature, an appropriate first-person viewpoint image can be generated based on whether the player has made a play motion with the right hand or the left hand. This makes it possible for the player to easily play the game, for example.

In the image generation system, the information acquisition section may perform an image process based on the image information from the image sensor, and may acquire at least one of direction information, color information, and shape information about a thing held by the player or part of the player as rendering information; and the image generation section may perform a rendering process based on the rendering information that is at least one of the direction information, the color information, and the shape information to generate the image.

According to this feature, the direction information, the color information, or the shape information about a thing held by the player or part of the player acquired by the image process based on the image information can be reflected in the rendering process. This makes it possible to generate an image while reflecting the movement of a thing held by the player or part of the player, for example.

The image generation system may further comprise: a hit calculation section that performs a hit calculation process, the information acquisition section may perform an image process based on the image information from the image sensor, and may acquire at least one of direction information and shape information about a thing held by the player or part of the player as hit calculation information; and the hit calculation section may perform the hit calculation process based on the hit calculation information acquired by the information acquisition section.

According to this feature, the direction information, the color information, or the shape information about a thing held by the player or part of the player acquired by the image process can be reflected in the hit calculation process. This makes it possible to generate an image while reflecting the movement of a thing held by the player or part of the player, for example.

According to another embodiment of the invention, there is provided an image generation system comprising:

an information acquisition section that acquires information about a distance between a display section that displays an image and a player;

a virtual camera control section that controls a virtual camera; and an image generation section that generates an image viewed from the virtual camera in an object space, the virtual camera control section increasing a distance between a character cot-responding to the player and the virtual camera in a depth direction, or increasing an angle of view of the virtual camera, as the distance between the display section and the player increases.

According to this embodiment, the information about the distance between the display section and the player is acquired. The distance between the character and the virtual camera in the depth direction, or the angle of view of the virtual camera is increased as the distance between the display section and the player increases, and an image viewed from the virtual camera in the object space is generated. This makes it possible to generate an image while reflecting the information about the distance between the display section and the player in the distance between the character and the virtual camera in the depth direction or the angle of view of the virtual camera. Therefore, the distance between the character and the virtual camera in the depth direction or the angle of view of the virtual camera changes depending on the movement of the player and the like, so that a novel virtual camera viewpoint setting method can be implemented, According to another embodiment of the invention, there is provided an image generation system comprising:

an information acquisition section that acquires information about a distance between a display section that displays an image and a player;

a virtual camera control section that controls a virtual camera; and an image generation section that generates an image viewed from the virtual camera in an object space, the virtual camera control section setting the virtual camera to a first-person viewpoint when the distance between the display section and the player is short, and setting the virtual camera to a third-person viewpoint when the distance between the display section and the player is long.

According to this embodiment, the information about the distance between the display section and the player is acquired. The virtual camera is set to a first-person viewpoint when the distance between the display section and the player is short, and set to a third-person viewpoint when the distance between the display section and the player is long, and an image viewed from the virtual camera in the object space is generated. Therefore, the viewpoint can be switched between a first-person viewpoint and a third-person viewpoint based on the distance between the display section and the player. This makes it possible to implement a novel virtual camera viewpoint setting method.

Exemplary embodiments of the invention are described below. Note that the following embodiments do not in any way limit the scope of the invention laid out in the claims. Note also that all elements of the following embodiments should not necessarily be taken as essential requirements of the invention.

1. Configuration

FIG. 1 shows an example of a block diagram of an image generation system (game device) according to one embodiment of the invention. Note that the configuration of the image generation system according to this embodiment is not limited to that shown in FIG. 1. Various modifications may be made, such as omitting some of the elements (sections) or adding other elements.

An operation section 160 allows the player to input operation data. The function of the operation section 160 may be implemented by a direction key, an operation button, an analog stick, a lever, a sensor (e.g., angular velocity sensor or acceleration sensor), a microphone, a touch panel display, or the like.

The operation section 160 includes an image sensor implemented by a color image sensor, a depth sensor, and the like. The function of the operation section 160 may be implemented by only the image sensor.

A storage section 170 serves as a work area for a processing section 100, a communication section 196, and the like. The function of the storage section 170 may be implemented by a RAM (DRAM or VRAM) or the like. A game program and game data that is necessary for executing the game program are stored in the storage section 170.

An information storage medium 180 (computer-readable medium) stores a program, data, and the like. The function of the information storage medium 180 may be implemented by an optical disk (CD or DVD), a hard disk drive (HDD), a memory (e.g., ROM), or the like. The processing section 100 performs various processes according to this embodiment based on a program (data) stored in the information storage medium 180. Specifically, a program that causes a computer (i.e., a device including an operation section, a processing section, a storage section, and an output section) to function as each section according to this embodiment (i.e., a program that causes a computer to execute the process of each section) is stored in the information storage medium 180.

A display section 190 outputs an image generated according to this embodiment. The function of the display section 190 may be implemented by an LCD, an organic EL display, a CRT, a touch panel display, a head mount display (HMD), or the like. A sound output section 192 outputs sound generated according to this embodiment. The function of the sound output section 192 may be implemented by a speaker, a headphone, or the like.

An auxiliary storage device 194 (auxiliary memory or secondary memory) is a storage device used to supplement the capacity of the storage section 170. The auxiliary storage device 194 may be implemented by a memory card such as an SD memory card or a multimedia card, or the like.

The communication section 196 communicates with the outside (e.g., another image generation system, a server, or a host device) via a cable or wireless network. The function of the communication section 196 may be implemented by hardware such as a communication ASIC or a communication processor, or communication firmware.

A program (data) that causes a computer to function as each section according to this embodiment may be distributed to the information storage medium 180 (or the storage section 170 or the auxiliary storage device 194) from an information storage medium included in a server (host device) via a network and the communication section 196. Use of the information storage medium included in the server (host device) is also included within the scope of the invention.

The processing section 100 (processor) performs a game process, an image generation process, a sound generation process, and the like based on operation data input from the operation section 160, a program, and the like. The processing section 100 performs various processes using the storage section 170 as a work area. The function of the processing section 100 may be implemented by hardware such as a processor (e.g., CPU or GPU) or an ASIC (e.g., gate array), or a program.

The processing section 100 includes an image information acquisition section 102, an information acquisition section 104, a game calculation section 108, a hit calculation section 110, an object space setting section 112, a character control section 114, a virtual camera control section 118, a determination section 119, an image generation section 120, and a sound generation section 130. The information acquisition section 104 includes a skeleton information acquisition section 105, and the character control section 114 includes a movement processing section 115 and a motion processing section 116. The image generation section 120 includes a light source setting section 122. Note that various modifications may be made, such as omitting some of these elements or adding other elements.

The image information acquisition section 102 acquires image information from the image sensor. For example, information about an image captured by the image sensor is stored in an image information storage section 171 of the storage section 170. Specifically, information about a color image captured by the color image sensor of the image sensor is stored in a color image information storage section 172, and information about a depth image captured by the depth sensor of the image sensor is stored in a depth information storage section 173. The image information acquisition section 102 reads (acquires) the image information from the image information storage section 171.

The information acquisition section 104 acquires position information about the player based on the image information acquired by the image information acquisition section 102. The information acquisition section 104 also acquires rendering information and hit calculation information.

The game calculation section 108 performs a game calculation process. The game calculation process includes starting the game when game start conditions have been satisfied, proceeding with the game, calculating the game results, and finishing the game when game finish conditions have been satisfied, for example.

The hit calculation section 110 performs a hit calculation process. For example, the hit calculation section 110 performs a hit check process and a hit effect process. Specifically, the hit calculation section 110 determines whether or not the trajectory direction of a bullet or the like intersects a target object, and performs the hit effect process or the like when the hit calculation section 110 has determined that the trajectory direction intersects the target object.

The object space setting section 112 sets an object space in which a plurality of objects are disposed. For example, the object space setting section 112 disposes an object (i.e., an object formed by a primitive surface such as a polygon, a free-form surface, or a subdivision surface) that represents a display object such as a character (e.g., human, animal, robot, car, ship, or airplane), a map (topography), a building, a course (road), a tree, or a wall in the object space. Specifically, the object space setting section 112 determines the position and the rotation angle (synonymous with orientation or direction) of the object in a world coordinate system, and disposes the object at the determined position (X, Y, Z) and the determined rotation angle (rotation angles around X, Y, and Z axes). More specifically, an object data storage section 175 of the storage section 170 stores an object number, and object data (e.g., the position, rotation angle, moving speed, and moving direction of the object (part object)) that is linked to the object number. The object space setting section 112 updates the object data every frame, for example.

The character control section 114 controls the character that moves (make a motion) in the object space. For example, the movement processing section 115 included in the character control section 114 moves the character (model object or moving object). The movement processing section 115 moves the character in the object space based on operation information input by the player using the operation section 160, a program (movement algorithm), various types of data, and the like. Specifically, the movement processing section 115 performs a simulation process that sequentially calculates movement information (position, rotation angle, speed, or acceleration) about the character every frame (e.g., 1/60th of a second). The term "frame" refers to a time unit used when performing the movement process, the motion process, and the image generation process.

The motion processing section 116 included in the character control section 114 performs a motion process (motion reproduction or motion generation) that causes the character to make a motion (animation). The motion process may be implemented by reproducing the motion of the character based on motion data stored in a motion data storage section 176, for example.

Specifically, the motion data storage section 176 stores the motion data including the position or the rotational angle (i.e., the rotation angles of a child bone around three axes with respect to a parent bone) of each bone that forms the skeleton of the character (model object) (i.e., each part object that forms the character). A model data storage section 177 stores model data about the model object that indicates the character. The motion processing section 116 reproduces the motion of the character by reading the motion data from the motion data storage section 176, and moving each bone (part object) that forms the skeleton (i.e., changing the shape of the skeleton) based on the motion data.

The virtual camera control section 118 controls a virtual camera (viewpoint or reference virtual camera) for generating an image viewed from a given (arbitrary) viewpoint in the object space. Specifically, the virtual camera control section 118 controls the position (X, Y, Z) or the rotational angle (rotational angles around X, Y, and Z axes) of the virtual camera (i.e., controls the viewpoint position, the line-of-sight direction, or the angle of view).

For example, when photographing the character from behind using the virtual camera, the virtual camera control section 118 controls the position or the rotational angle (direction) of the virtual camera so that the virtual camera follows a change in the position or the rotation of the character. In this case, the virtual camera control section 118 may control the virtual camera based on information (e.g., position, rotational angle, or speed) of the character obtained by the movement processing section 115. Alternatively, the virtual camera control section 118 may rotate the virtual camera by a predetermined rotational angle, or may move the virtual camera along a predetermined moving path. In this case, the virtual camera control section 118 controls the virtual camera based on virtual camera data that specifies the position (moving path) or the rotational angle of the virtual camera.

The determination section 119 determines whether the player has made a play motion with the right hand or the left hand. Specifically, the determination section 119 determines whether the player has made the play motion such as an attack motion or a movement instruction operation with the right hand or the left hand. The term "hand" used herein includes both the end part of a person's arm beyond the wrist and the entire arm.

The image generation section 120 performs a drawing process based on the results of various processes (game process and simulation process) performed by the processing section 100 to generate an image, and outputs the generated image to the display section 190. Specifically, the image generation section 120 performs a geometric process (e.g., coordinate transformation (world coordinate transformation and camera coordinate transformation), clipping, perspective transformation, or light source process), and generates drawing data (e.g., primitive surface vertex position coordinates, texture coordinates, color data, normal vector, or alpha-value) based on the results of the geometric process. The image generation section 120 draws the object (one or more primitive surfaces) subjected to perspective transformation in a drawing buffer 179 (i.e., a buffer (e.g., frame buffer or work buffer) that can store image information of each pixel) based on the drawing data (primitive surface data). The image generation section 120 thus generates an image viewed from the virtual camera (given viewpoint) in the object space. The drawing process may be implemented by a vertex shader process or a pixel shader process.

The light source setting section 122 included in the image generation section 120 sets a light source. For example, the light source setting section 122 sets light source information such as the light source direction, the light source color, and the light source position. The light source information is stored in a light source information storage section 178.

The image generation section 120 may generate a stereoscopic image. In this case, a left-eye virtual camera and a right-eye virtual camera are disposed using a reference virtual camera position and a reference inter-camera distance. The image generation section 120 generates a left-eye image viewed from the left-eye virtual camera in the object space, and generates a right-eye image viewed from the right-eye virtual camera in the object space. Stereoscopic vision may be implemented by a dichoptic method or a naked-eye method using a lenticular lens or the like by utilizing the left-eye image and the right-eye image.

The sound generation section 130 performs a sound process based on the results of various processes performed by the processing section 100 to generate game sound (e.g., background music (BGM), effect sound, or voice), and outputs the generated game sound to the sound output section 192.

In this embodiment, when the information acquisition section 104 has acquired the image information from the image sensor, the information acquisition section 104 acquires position information about the player (observer) relative to the display section 190 or the image sensor. The position information indicates the relative positional relationship of the player with the display section 190 or the image sensor. The position information may be information about the three-dimensional position coordinates of the player relative to the display section 190 or the image sensor, or may be distance information that indicates the distance between the player and the display section 190 or the image sensor, for example.

When the information acquisition section 104 has acquired the position information about the player, the virtual camera control section 118 controls at least one of the distance between the character corresponding to the player and the virtual camera in the depth direction, the distance between the character and the virtual camera in the height direction, the distance between the character and the virtual camera in the transverse direction, and the angle of view of the virtual camera, based on the acquired position information. The image generation section 120 then generates an image viewed from the virtual camera in the object space. The character is displayed on the display section 190 when using a third-person viewpoint, but is a virtual object that is not displayed on the display section 190 when using a first-person viewpoint.

Specifically, the virtual camera control section 118 increases the distance between the character and the virtual camera in the depth direction (direction Z) as the distance between the display section 190 or the image sensor and the player increases. For example, when the player has moved away from the display section 190 or the image sensor, the virtual camera that has photographed the character from behind moves backward in the depth direction. When the player has approached the display section 190 or the image sensor, the virtual camera moves forward in the depth direction. In this case, the character remains stationary, for example.

The virtual camera control section 118 may increase the distance between the character and the virtual camera in the height direction as the distance between the display section 190 or the image sensor and the player increases. For example, when the player has moved away from the display section 190 or the image sensor, the virtual camera that has photographed the character downward from behind moves upward. When the player has approached the display section 190 or the image sensor, the virtual camera moves downward. In this case, the character remains stationary, for example. Note that the virtual camera may move backward while moving upward, or may move forward while moving downward depending on the distance between the display section 190 or the image sensor and the player.

The virtual camera control section 118 may increase the angle of view of the virtual camera as the distance between the display section 190 or the image sensor and the player increases. For example, when the player has moved away from the display section 190 or the image sensor, a zoom-out image is generated due to an increase in the angle of view of the virtual camera. When the player has approached the display section 190 or the image sensor, a zoom-in image is generated due to a decrease in the angle of view of the virtual camera. In this case, the character remains stationary, for example.

The virtual camera control section 118 moves the virtual camera when the player has moved in one of the leftward direction and the rightward direction relative to the display section 190 or the image sensor, the virtual camera being moved in the other of the leftward direction and the rightward direction relative to the character. Specifically, when the player has moved in the leftward direction relative to the display section 190 or the image sensor, the virtual camera control section 118 moves the virtual camera in the rightward direction relative to the character. When the player has moved in the rightward direction relative to the display section 190 or the image sensor, the virtual camera control section 118 moves the virtual camera in the leftward direction relative to the character.

Note that the expression "the player has moved in the leftward direction or the rightward direction relative to the display section 190 or the image sensor" means that the player has moved in the leftward direction or the rightward direction relative to the direction from the player to the display section 190 or the image sensor. The expression "the virtual camera is moved in the rightward direction or the leftward direction relative to the character" means that the virtual camera is moved in the rightward direction or the leftward direction relative to the direction from the virtual camera to the character.

The virtual camera control section 118 sets the virtual camera to a first-person viewpoint when the distance between the display section 190 or the image sensor and the player is short (i.e., shorter than a reference distance). The virtual camera control section 118 sets the virtual camera to a third-person viewpoint when the distance between the display section 190 or the image sensor and the player is long (i.e., longer than a reference distance). For example, when the virtual camera is set to a first-person viewpoint, the character is a virtual object that is not displayed on the display section 190. When the virtual camera is set to a first-person viewpoint, only part (e.g., hand) of the character may be displayed. Specifically, at least the head of the character is not displayed when the virtual camera is set to a first-person viewpoint, for example. When the virtual camera is set to a third-person viewpoint, the character is displayed on the display section 190. Specifically, the whole body of the character, or part of the character including the head is displayed. Specifically, at least the head of the character is displayed when the virtual camera is set to a third-person viewpoint, for example.

When the virtual camera has been set to a first-person viewpoint by controlling the angle of view of the virtual camera, the image generation section 120 performs a clipping process that excludes at least part of the character from the drawing target. For example, the image generation section 120 excludes the entire character from the drawing target (view volume), or excludes part of the character other than the hand or the like from the drawing target.

The image information acquisition section 102 acquires depth information as the image information from the image sensor. The depth information is image information in which a depth value is set to each pixel position, for example. The information acquisition section 104 acquires the position information about the player based on the depth information acquired by the image information acquisition section 102. For example, the information acquisition section 104 acquires information about the distance between the display section 190 or the image sensor and the player as the position information about the player based on the depth value of the depth information included in the image area of the player.

The determination section 119 determines whether the player has made a play motion with the right hand or the left hand. In this case, the image generation section 120 generates a different image based on whether the player has made a play motion with the right hand or the left hand.

Specifically, the information acquisition section 104 acquires skeleton information that specifies the motion of the player viewed from the image sensor based on the image information from the image sensor. The acquired skeleton information is stored in a skeleton information storage section 174.

The skeleton information specifies the motion of the player viewed from the image sensor, for example. Specifically, the skeleton information includes a plurality of pieces of joint position information corresponding to a plurality of joints of the player, each of the plurality of pieces of joint position information including three-dimensional coordinate information. Each joint connects bones, and a skeleton is formed by connecting a plurality of bones.

When the skeleton information has been acquired, the determination section 119 determines whether the player has made a play motion with the right hand or the left hand based on the skeleton information. Specifically, the determination section 119 determines whether the player has made a play motion with the right hand or the left hand by analyzing the movement of each joint position based on the skeleton information.

When the determination section 119 has determined that the player has made a play motion with the right hand when the virtual camera is set to a third-person viewpoint, the image generation section 120 generates an image in which the character is displayed on the left side of the screen (e.g., in a left area with respect to the center of the screen). When the determination section 119 has determined that the player has made a play motion with the left hand when the virtual camera is set to a third-person viewpoint, the image generation section 120 generates an image in which the character is displayed on the right side of the screen (e.g., in a right area with respect to the center of the screen).

When the determination section 119 has determined that the player has made a play motion with the right hand when the virtual camera is set to a first-person viewpoint, the image generation section 120 generates an image in which part (e.g., hand) of the character is displayed on the right side of the screen. When the determination section 119 has determined that the player has made a play motion with the left hand when the virtual camera is set to a first-person viewpoint, the image generation section 120 generates an image in which part of the character is displayed on the left side of the screen.

The image generation section 120 thus generates a different image based on whether the player has made a play motion with the right hand or the left hand.

In this embodiment, when the image information acquisition section 102 has acquired the image information from the image sensor, the information acquisition section 104 performs the image process based on the image information. The information acquisition section 104 acquires at least one of direction information, color information, and shape information about a thing held by the player (observer) or part of the player (observer) as rendering information.

The term "thing held by the player" refers to an object held (possessed) by the player in the real world. The term "part of the player" refers to part of the body of the player, such as the hand, foot, arm, thigh, head, or breast. The direction information about a thing held by the player or part of the player indicates the direction of the thing or part (e.g., the direction in which the thing or part faces, or the normal direction of the surface of the thing or part). The color information about a thing held by the player or part of the player indicates the color of the thing or part. The shape information about a thing held by the player or part of the player indicates the shape of the thing or part (i.e., information that approximately indicates a shape) (e.g., a planar shape such as a polygon or a circle, or a three-dimensional shape such as a polyhedron, a sphere, a column, or a pyramid). The rendering information is used for an image rendering process.

The image generation section 120 performs the rendering process (shading process) based on the rendering information (shading information) (i.e., at least one of the direction information, the color information, and the shape information) to generate an image. For example, the image generation section 120 performs the rendering process while setting the direction information, the color information, or the shape information about a thing held by the player or part of the player as a parameter of the rendering process, and generates an image viewed from the virtual camera in the object space.

Specifically, the image generation section 120 sets light source information (light source attribute information) about a light source disposed in the object space based on the rendering information. For example, the image generation section 120 sets the light source direction based on the direction information about a thing held by the player or part of the player, sets the light source color based on the color information, and sets the light source shape based on the shape information. The image generation section 120 performs the rendering process using the light source for which the light source information is set, and generates an image viewed from the virtual camera in the object space. For example, the image generation section 120 performs the shading process based on the light source information about the light source and the normal vector of the polygon (primitive surface) of the object, and generates an image. In this case, the image generation section 120 performs the shading process such as Gouraud shading or Phong shading using the Lambert illumination model, the Phong illumination model, the Blinn illumination model, or the like.

The image generation section 120 specifies the position of the light source in the object space based on the skeleton information about the player acquired based on the image information and the position information about the character. For example, the image generation section 120 specifies the position of the light source based on the position information (representative position information) about the character in a world coordinate system of the object space and the joint position information (position information about a joint corresponding to a thing or a part) about the skeleton in a local coordinate system.

The image information acquisition section 102 acquires the depth information and the color image information as the image information from the image sensor. The information acquisition section 104 acquires at least one of the direction information and the shape information about a thing held by the player or part of the player as the rendering information based on the depth information acquired by the image information acquisition section 102. For example, the information acquisition section 104 determines (acquires) the direction or the shape of a thing held by the player or part of the player as the rendering information based on the depth information or the color image information.

The information acquisition section 104 may acquire the skeleton information based on the image information from the image sensor, and may acquire the direction information about a thing held by the player or part of the player based on the acquired skeleton information. For example, the information acquisition section 104 sets a direction that connects first and second joints corresponding to the hand of the skeleton as the direction information about a thing held by the player or part of the player.

The information acquisition section 104 may set a processing area of the image process for acquiring the rendering information based on the acquired skeleton information. For example, the information acquisition section 104 specifies the position of a thing held by the player or part of the player based on the skeleton information, and sets an area having a given size (i.e., an area that is smaller than the screen) and including the specified position as the processing area. The information acquisition section 104 performs the image process using the depth information or the color image information corresponding to the processing area to acquire the direction information, the color information, or the shape information about a thing held by the player or part of the player.

The information acquisition section 104 performs the image process based on the image information from the image sensor, and acquires at least one the direction information and the shape information about a thing held by the player or part of the player as hit calculation information. The hit calculation section 110 performs the hit calculation process based on the acquired hit calculation information. For example, the hit calculation section 110 performs a hit calculation process (hit check process) that reflects the direction or the shape of a thing held by the player or part of the player. Specifically, the hit calculation section 110 performs the hit calculation process on a target object (i.e., an object that is hit by a hitting object (e.g., bullet)) based on a trajectory direction (hit direction) specified by the direction information included in the hit calculation information. The image generation section 120 generates an image based on the result of the hit calculation process. For example, the image generation section 120 generates an image hitting object (e.g., bullet), and generates a hit effect image when the hitting object has hit the target object.

When the image information acquisition section 102 has acquired the depth information as the image information, the information acquisition section 104 may acquire at least one of the direction information and the shape information about a thing held by the player or part of the player based on the depth information acquired by the image information acquisition section 102. For example, the information acquisition section 104 determines (acquires) the direction or the shape of a thing held by the player or part of the player as the hit calculation information based on the depth information or the color image information.

The information acquisition section 104 acquires the direction information about a thing held by the player or part of the player based on the skeleton information during the hit calculation process in the same manner as the rendering process. The information acquisition section 104 sets a processing area of the image process for acquiring the hit calculation information based on the skeleton information.

2. Method According to this Embodiment

The method according to this embodiment is described in detail below.

2.1 Virtual Camera Control Based on Position Information about Player

A game device is normally designed so that the player performs a game operation by operating a button or a lever of a game controller. A game device may be configured so that a motion sensor (six-axis sensor) is provided in a game controller, and the player performs a game operation by moving the game controller.

However, since a game device provided with such an operation interface requires a game controller for the player to perform a game operation, it is impossible to directly reflect a gesture (e.g., hand motion) made by the player. This makes it difficult for the player to be fully involved in virtual reality.

In order to deal with this problem, this embodiment employs an operation interface that detects an operation input of the player based on image information acquired (captured) by the image sensor.

Figure 2A:
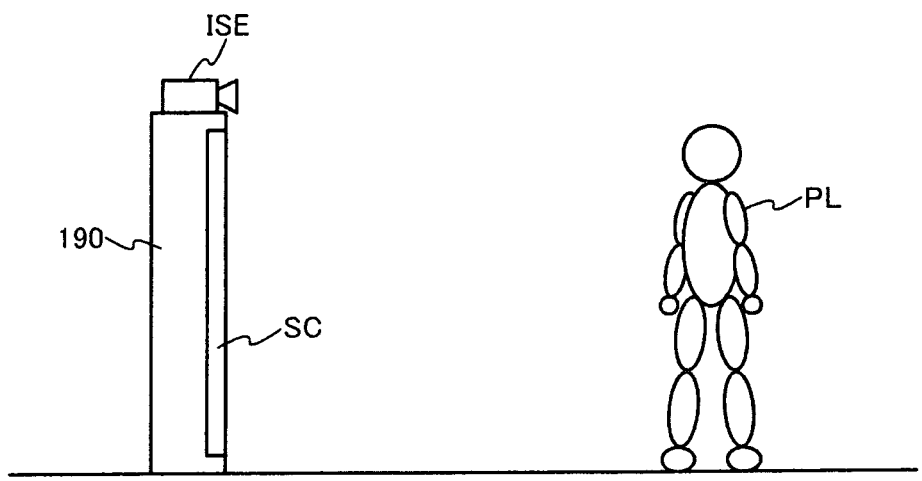
FIGS. 2A and 2B are views illustrative of a method that acquires color image information and depth information using an image sensor.

In FIG. 2A, an image sensor ISE that includes a depth sensor (e.g., infrared sensor) and a color image sensor (i.e., RGB sensor such as a CCD or a CMOS sensor), is provided at a position corresponding to the display section 190, for example. The image sensor ISE is provided so that the imaging direction (optical axis direction) of the image sensor ISE coincides with the direction from the display section 190 to a player PL, for example. The image sensor ISE acquires color image information and depth information about the player PL viewed from the display section 190. The image sensor ISE may be provided in the display section 190, or may be provided as an external element (component).

Figure 2B:
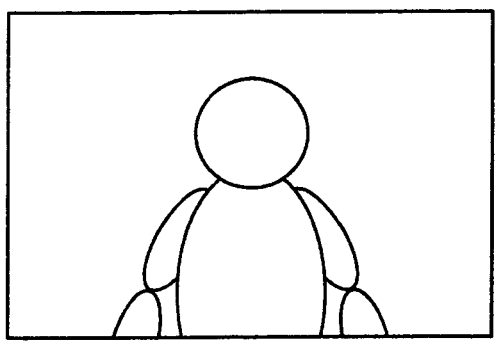
Figure 2B:
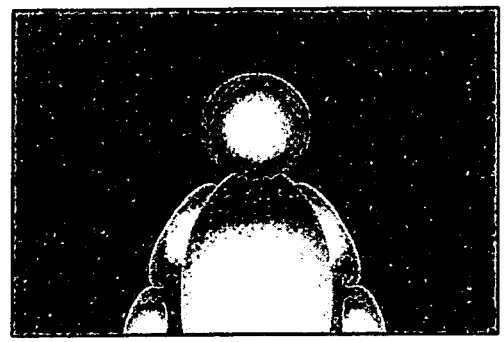

Color image information and depth information shown in FIG. 2B are acquired using the image sensor ISE shown in 2A. For example, the color image information includes color information about the player PL and his surroundings. The depth information includes depth values of the player PL and his surroundings as grayscale values, for example. The color image information may be image information in which a color value (RGB) is set to each pixel position, and the depth information may be image information in which a depth value is set to each pixel position, for example. Note that the image sensor ISE may be a sensor in which the depth sensor and the color image sensor are separately provided, or may be a sensor in which the depth sensor and the color image sensor are integrated.

The depth information may be acquired by a known method. For example, the depth information is acquired by emitting light (e.g., infrared radiation) from the image sensor ISE (depth sensor), and detecting the reflection intensity or the time of flight of the emitted light to detect the shape of the object (e.g., player PL) viewed from the position of the image sensor ISE. The depth information is indicated by grayscale data (e.g., an object positioned near the image sensor ISE is bright, and an object positioned away from the image sensor ISE is dark). Note that the depth information may be acquired in various ways. For example, the depth information (i.e., information about the distance from the object) may be acquired simultaneously with the color image information using a CMOS sensor or the like. The depth information may also be acquired using a distance sensor (ranging sensor) or the like that utilizes ultrasonic waves, for example.

In this embodiment, the position information (relative positional relationship) about the player PL relative to the display section 190 or the image sensor ISE is acquired based on the image information from the image sensor ISE.

For example, the three-dimensional shape of the player or the like viewed from the display section 190 (image sensor) can be acquired based on the depth information shown in FIG. 2B. Therefore, the position coordinates X and Y (representative position coordinates) of the player PL can be determined based on the two-dimensional coordinates of the pixel position indicated by the depth information, and the position coordinate Z of the player PL can be determined based on the depth value of the pixel position.

Note that the position information (representative position coordinates) about the player PL may be determined based on the color image information. Specifically, an image recognition process (e.g., face image recognition process) is performed on the player PL based on the color image information. The position coordinates X and Y of the player PL are determined based on the two-dimensional coordinates of the pixel position indicated by the color image information. The position coordinate Z of the player PL is determined by detecting a change in size of the image area of the player PL indicated by the color image information. Note that the position information about the player PL need not necessarily be three-dimensional coordinate information, but may be information (position coordinate Z) about the distance between the display section 190 or the image sensor ISE and the player PL, for example.

In this embodiment, the distance between the character corresponding to the player PL and the virtual camera in the depth direction is controlled based on the position information about the player PL thus acquired. Alternatively, the distance between the character and the virtual camera in the height direction, or the distance between the character and the virtual camera in the transverse direction is controlled based on the position information about the player PL. Alternatively, the angle of view of the virtual camera may be controlled based on the position information about the player PL. The position information (distance information) about the player PL may be position information relative to the image sensor ISE (information about the distance from the image sensor). The following description mainly illustrates an example in which the position information (distance information) about the player PL is position information relative to the display section 190 (information about the distance from the display section) for convenience of description.

Figure 3A:
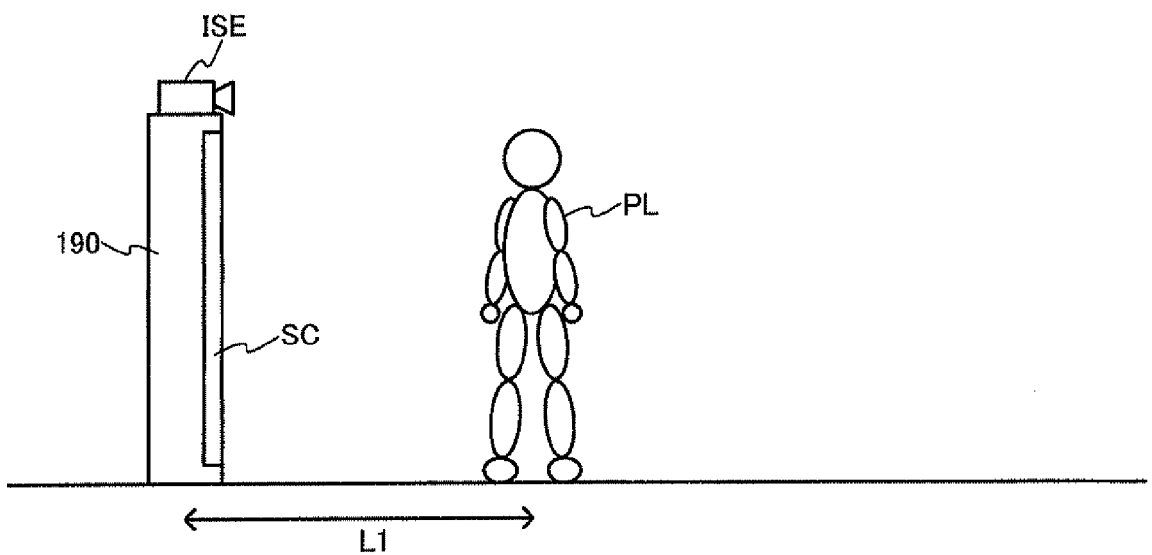
FIGS. 3A and 3B are views illustrative of a method that changes the distance between a character and a virtual camera in the depth direction based on position information about a player.

In FIG. 3A, the player PL is positioned near the display section 190 (image sensor), for example. In this case, it is determined that the distance (L1) between the display section 190 (image sensor) and the player PL is short based on the position information about the player PL acquired based on the image information from the image sensor ISE.

Figure 3B:
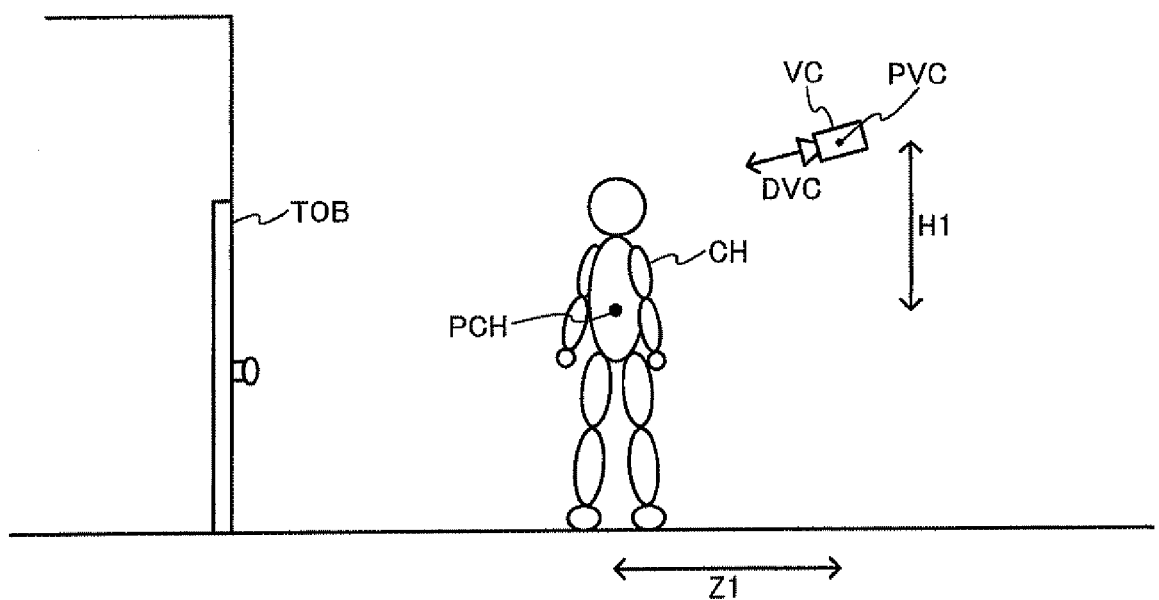

In FIG. 3B, a character CH corresponds to the player PL. The character CH is an object that moves in the object space based on an operation performed by the player PL. When it has been determined that the distance (L1) between the display section 190 (image sensor) and the player PL is short (see FIG. 3A), the distance between the virtual camera VC and the character CH in the depth direction (direction Z) is set to a short distance Z1 (see FIG. 3B).

Figure 4A:
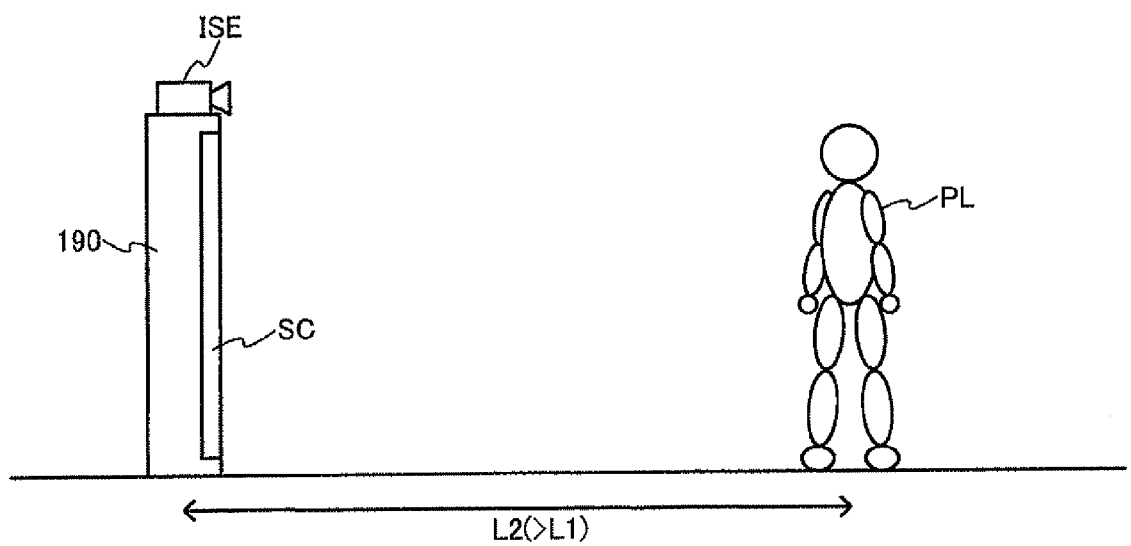
FIGS. 4A and 4B are views illustrative of a method that changes the distance between a character and a virtual camera in the depth direction based on position information about a player.

In FIG. 4A, the player PL is positioned away from the display section 190. In this case, it is determined that the distance (L2 (L2>L1)) between the display section 190 (image sensor) and the player PL is long based on the position information about the player PL acquired based on the image information from the image sensor ISE.

Figure 4B:
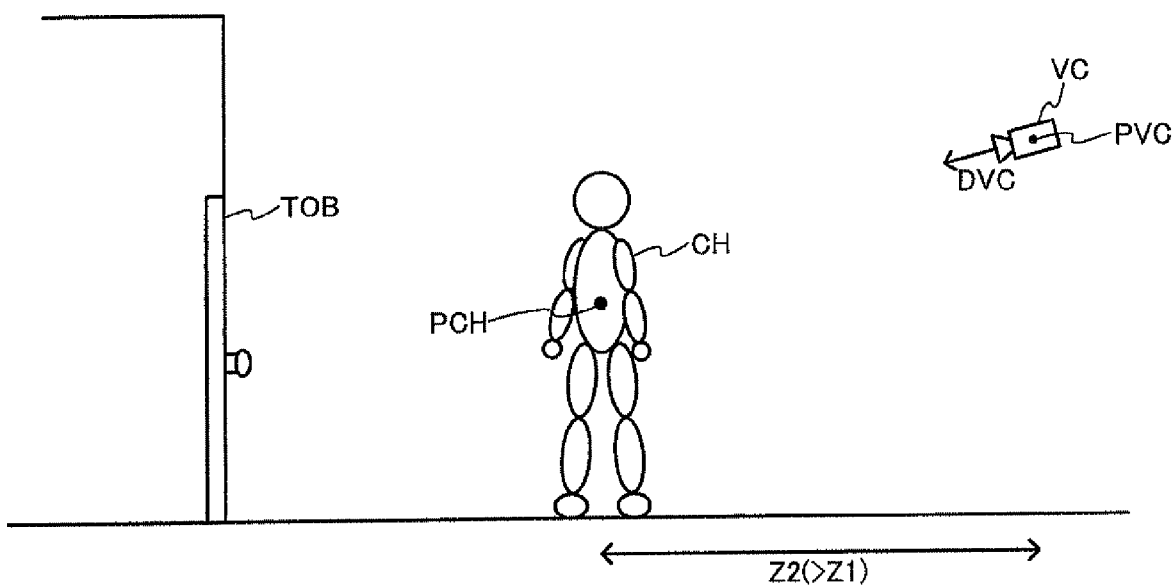

Therefore, the distance between the virtual camera VC and the character CH in the depth direction is set to a long distance Z2 (Z2>Z1) (see FIG. 4B).

In FIGS. 3A to 4B, the distance between the character CH and the virtual camera VC in the depth direction is increased as the distance between the display section 190 and the player PL increases. Therefore, when the player PL has approached the display section 190 (see FIG. 3A), the virtual camera VC approaches the character CH in the object space (game space) (see FIG. 3B). Specifically, the virtual camera VC moves in the direction in which the virtual camera VC approaches the character CH that remains stationary. Therefore, the virtual camera VC zooms in on the character CH and its surrounding situation, and the player PL can closely observe the character CH corresponding to the player PL and its surrounding situation.

On the other hand, when the player PL has moved away from the display section 190 (see FIG. 4A), the virtual camera VC moves away from the character CH in the object space (see FIG. 4B). Specifically, the virtual camera VC moves in the direction in which the virtual camera VC moves away from the character CH that remains stationary. Therefore, the virtual camera VC zooms out the character CH and its surrounding situation, and the player PL can widely observe the character CH and its surrounding situation.

When the player PL has approached the display section 190, and the distance (L1) between the display section 190 and the player PL has been determined to be short (see FIG. 3A), the distance between the virtual camera VC and the character CH in the height direction (direction Y) is set to a short distance H1 (see FIG. 3B).

Figure 5A:
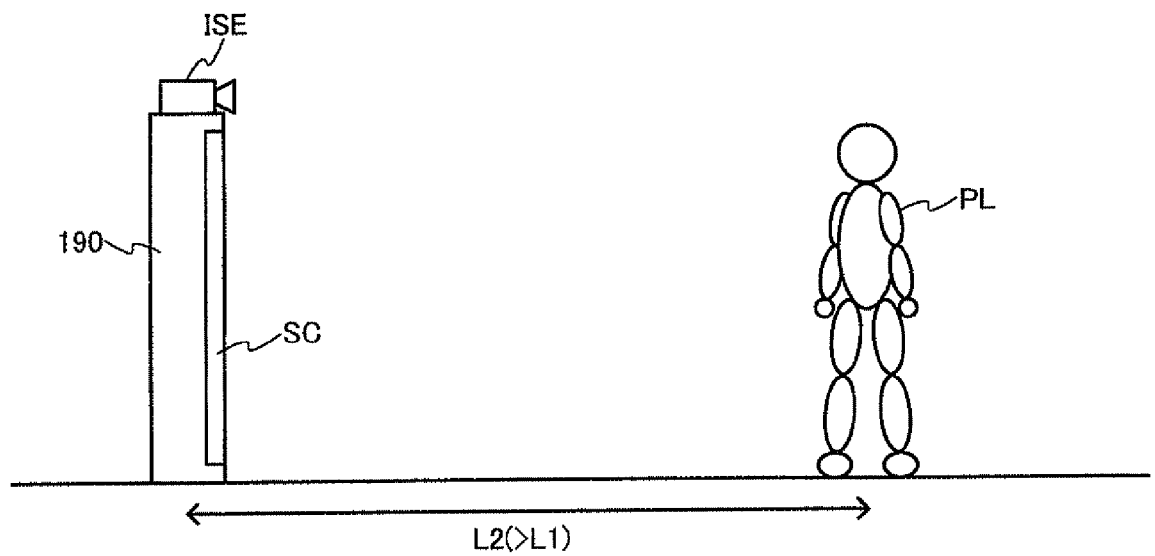
FIGS. 5A and 5B are views illustrative of a method that changes the distance between a character and a virtual camera in the height direction based on position information about a player.
Figure 5B:
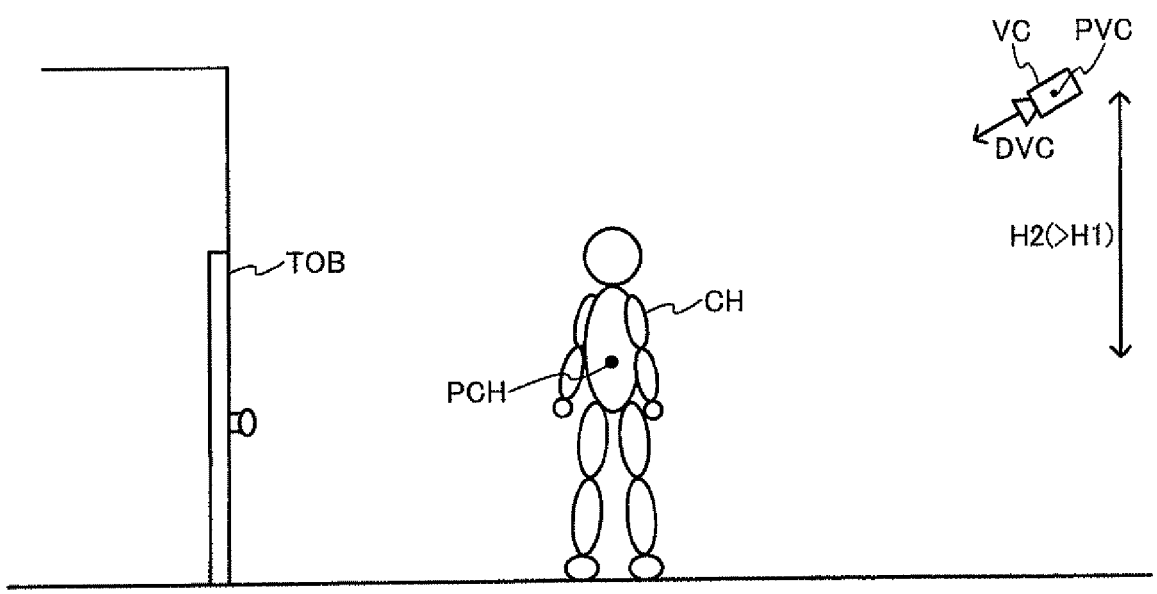

When the player PL has moved away from the display section 190, and the distance (L2) between the display section 190 and the player PL has been determined to be long (see FIG. 5A), the distance between the virtual camera VC and the character CH in the height direction is set to a long distance H2 (H2>H1) (see FIG. 5B).

In FIGS. 3A, 3B, 5A, and 5B, the distance between the character CH and the virtual camera VC in the height direction is increased as the distance between the display section 190 and the player PL increases.

Specifically, when the player PL has approached the display section 190 (see FIG. 3A), the virtual camera VC is set to a low position (see FIG. 3B). Therefore, the virtual camera VC zooms in on the character CH and its surrounding situation, and the player PL can closely observe the character CH and its surrounding situation.

When the player PL has moved away from the display section 190 (see FIG. 5A), the virtual camera VC is set to a high position (see FIG. 5B). Therefore, the virtual camera VC zooms out the character CH and its surrounding situation, and the player PL can widely observe the character CH and its surrounding situation from above.

When the distance between the display section 190 and the layer PL has increased, the virtual camera VC may be moved to a high position (see FIG. 5B), and may be moved to a position away from the character CH in the backward direction (see FIG. 4B).

The angle of view of the virtual camera may be controlled based on the distance between the player PL and the display section 190.

Figure 6A:
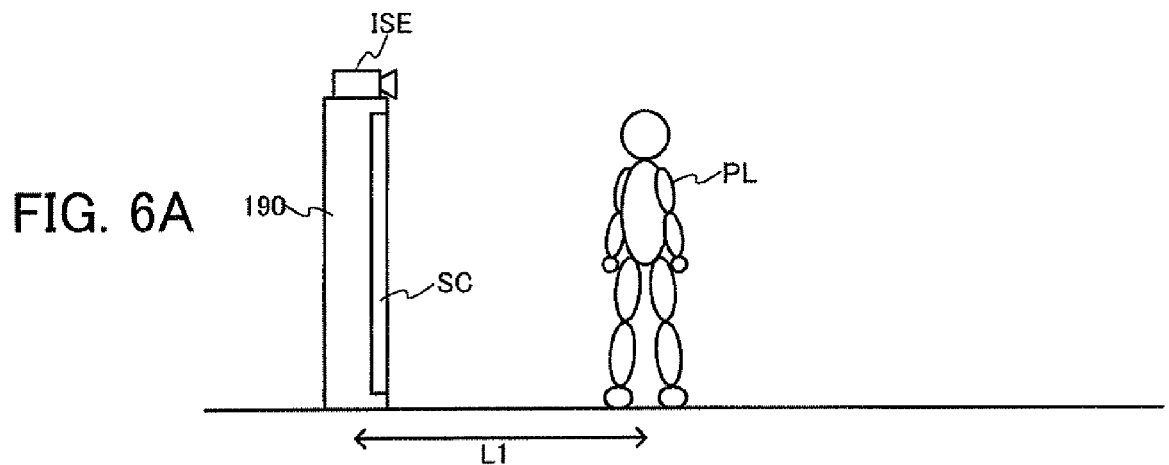
FIGS. 6A to 6D are views illustrative of a method that changes the angle of view of a virtual camera based on position information about a player.
Figure 6B:
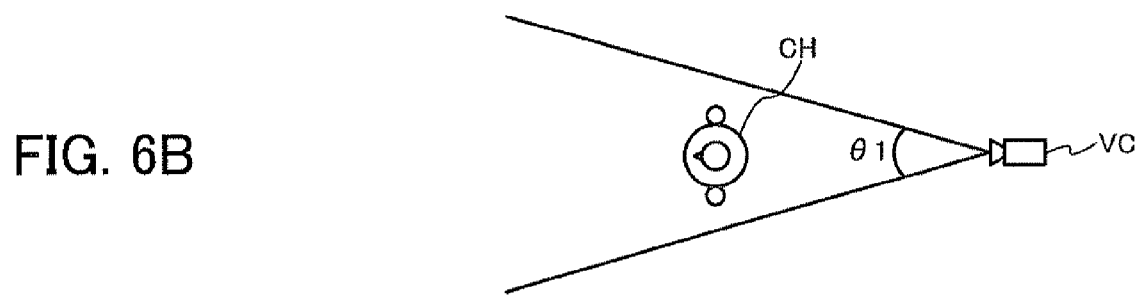

For example, when the player PL has approached the display section 190, and the distance (L1) between the display section 190 and the player PL has been determined to be short (see FIG. 6A), the angle of view of the virtual camera VC is set to a narrow angle θ1 (see FIG. 6B). The virtual camera VC zooms in on the character CH and its surrounding situation as a result of setting the angle of view of the virtual camera VC to the narrow angle θ1, and the player PL can closely observe the character CH and its surrounding situation.

Figure 6C:
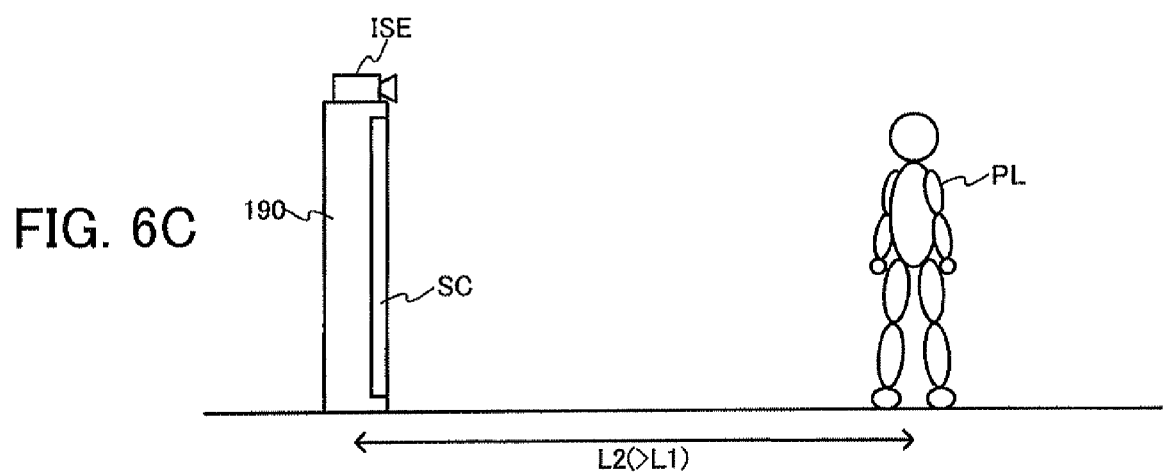
Figure 6D:
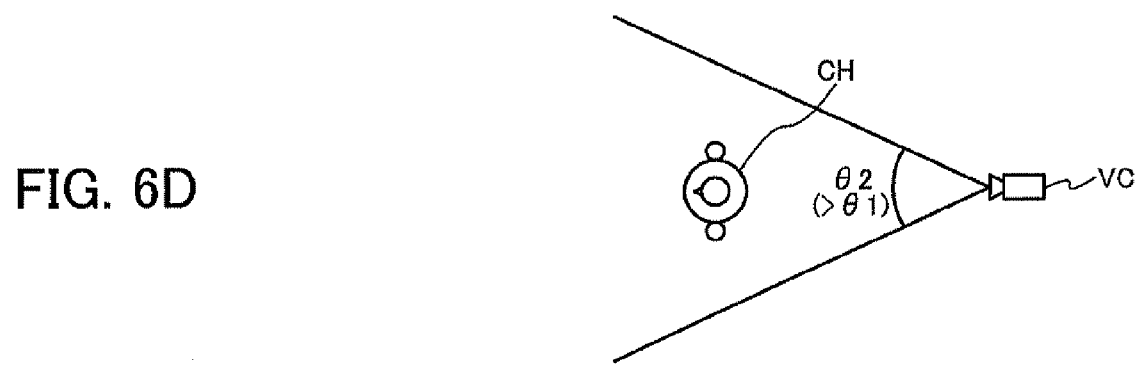

When the player PL has moved away from the display section 190, and the distance (L2) between the display section 190 and the player PL has been determined to be long (see FIG. 6C), the angle of view of the virtual camera VC is set to a wide angle θ2 (see FIG. 6D). The virtual camera VC zooms out the character CH and its surrounding situation as a result of setting the angle of view of the virtual camera VC to the wide angle θ2, and the player PL can widely observe the character CH and its surrounding situation.

According to the above method, the relative positional relationship of the virtual camera with the character changes when the player has approached or moved away from the display section, and the image displayed on the display section changes accordingly. Therefore, the viewpoint setting of the virtual camera in the object space can be controlled based on the movement of the player without using a game controller. This makes it possible to provide a novel operation interface environment.

Figure 7:
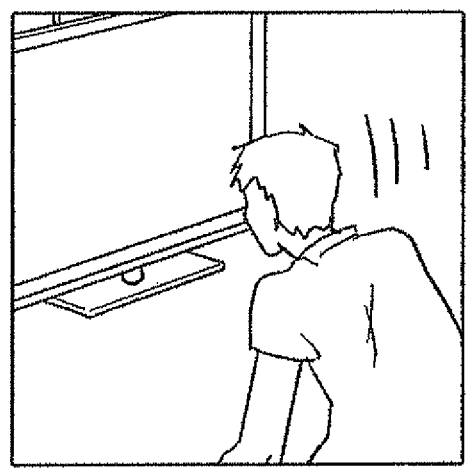
FIG. 7 is a view illustrative of an example of an operation interface environment implemented according to one embodiment of the invention.

When the player has approached and peered into the display section (see FIG. 7), the virtual camera approaches the character, and an image that closely shows the character and its surrounding situation is displayed on the display section. When the player has moved away from the display section, the virtual camera moves backward from the character, and an image that widely shows the character and its surrounding situation is displayed on the display section. This makes it possible to provide an operation interface environment that is intuitive and convenient for the player, so that virtual reality experienced by the player can be improved, for example.

In this embodiment, the positional relationship between the character and the virtual camera in the transverse direction may be changed based on the position information about the player.

Figure 8A:
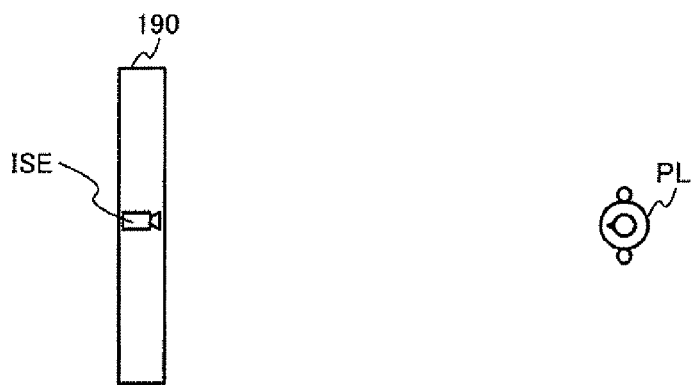
FIGS. 8A to 8D are views illustrative of a method that changes the distance between a character and a virtual camera in the transverse direction based on position information about a player.
Figure 8B:
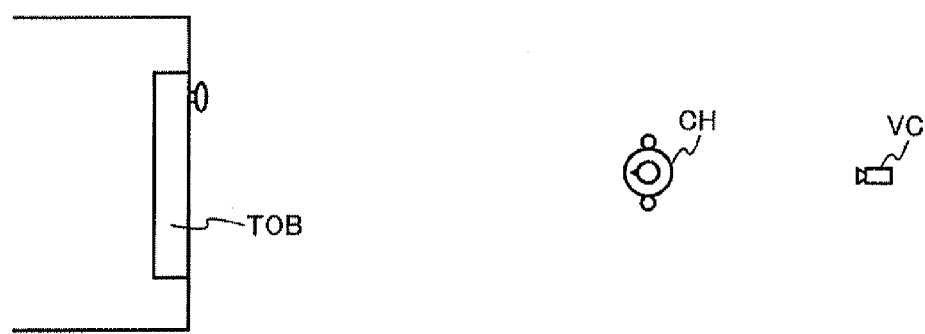

In FIG. 8A, the player PL is standing directly in front of the display section 190. In this case, the virtual camera VC is set directly behind the character CH in the object space (see FIG. 8B), and an image displayed on the display section 190 is generated.

Figure 8C:
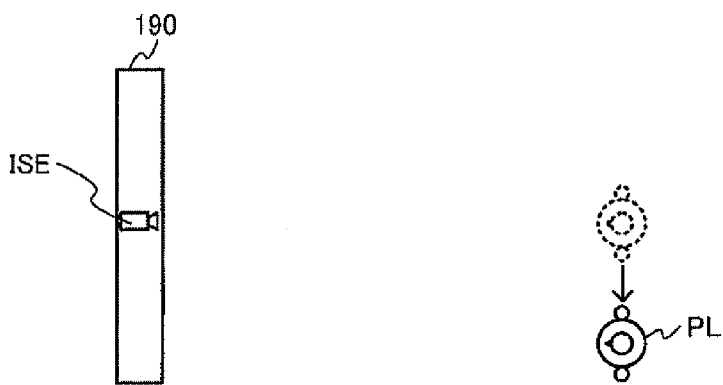

In FIG. 8C, the player PL has moved in the leftward direction relative to the display section 190. Note that the expression "the player PL moves in the leftward direction" means that the player PL moves in the leftward direction relative to the direction (front direction) from the player PL to the display section 190.

Figure 8D:
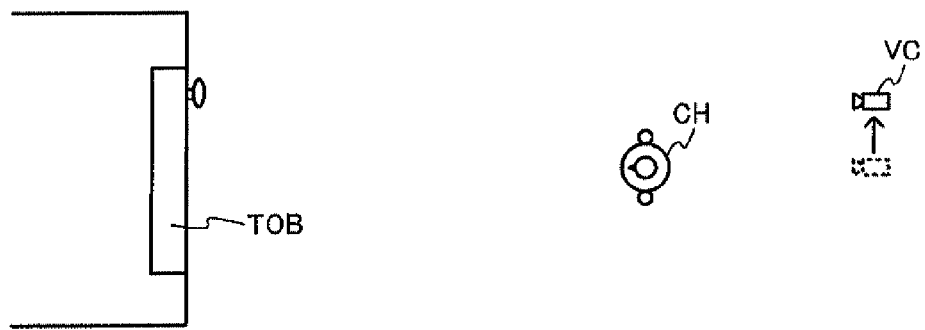

When the player PL has moved in the leftward direction relative to the display section 190 (see FIG. 8C), the virtual camera VC moves in the rightward direction relative to the character CH in the object space (game space) (see FIG. 8D). Note that the expression "the virtual camera VC moves in the rightward direction" means that the virtual camera VC moves in the rightward direction relative to the direction from the virtual camera VC to the character CH.

As shown in FIGS. 8A to 8D, when the player PL has moved in the leftward direction relative to the display section 190, the virtual camera VC moves in the rightward direction relative to the character CH. Specifically, the virtual camera VC moves in the direction opposite to the moving direction of the player PL. When the player PL has moved in the rightward direction relative to the display section 190, the virtual camera VC moves in the leftward direction relative to the character CH in the same manner as in FIGS. 8A to 8D. Specifically, the virtual camera VC moves in the direction opposite to the moving direction of the player PL.

Figure 9:
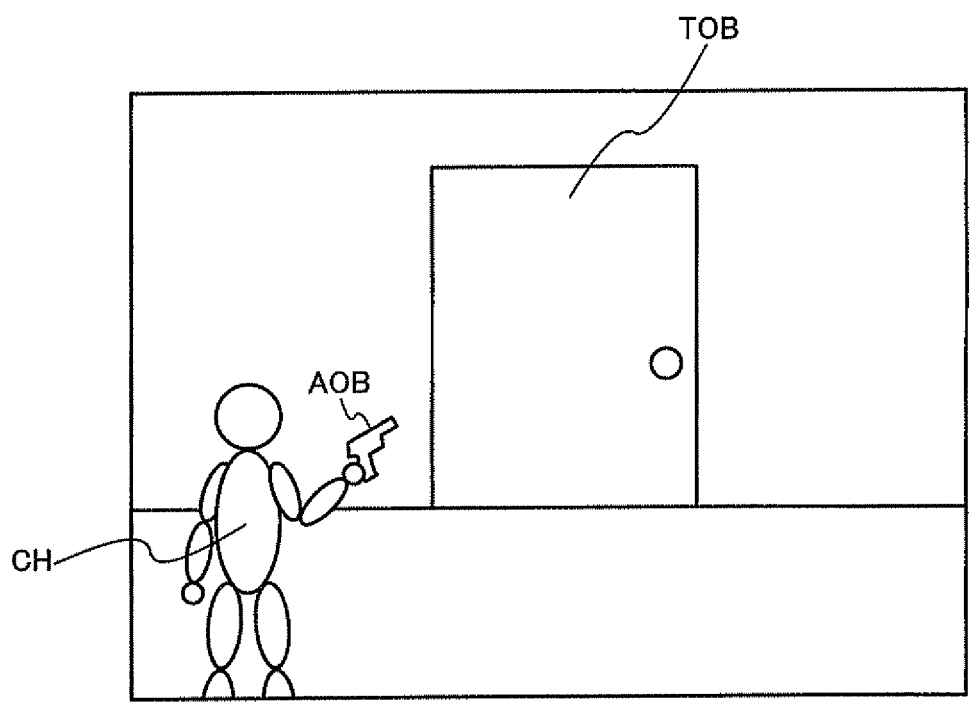
FIG. 9 shows an example of an image, generated according to one embodiment of the invention.

For example, an image shown in FIG. 9 can be generated by thus controlling the virtual camera VC. When implementing a game with a third-person viewpoint, for example, it is desirable to display an image in which the character CH is displayed on the left side of the screen of the display section 190 so that the player can observe the situation on the right side of the screen (see FIG. 9). This makes it possible for the player to move the character CH displayed on the left side of the screen in the game space while observing the state of a target object TOB (door in FIG. 9) and the like displayed on the right side of the screen. Therefore, the player can smoothly move (operate) the character in a three-dimensional game.

In this embodiment, when the player PL has moved in the leftward direction relative to the display section 190 (screen), the virtual camera VC moves in the rightward direction relative to the character CH (see FIGS. 8A to 8D), and an image shown in FIG. 9 is generated. Specifically, the character CH is displayed on the left side of the screen, and an enemy, topography, and the like are widely displayed on the right side of the screen. Therefore, the player PL can smoothly move the character even in a three-dimensional game for which the game operation is difficult. Since the virtual camera VC moves when the player PL has merely moved his body in the leftward direction or the like so that an image shown in FIG. 9 is generated, an intuitive and convenient operation interface environment can be provided.

In this embodiment, the viewpoint may be switched between a first-person viewpoint and a third-person viewpoint based on the position information about the player.

Figure 10A:
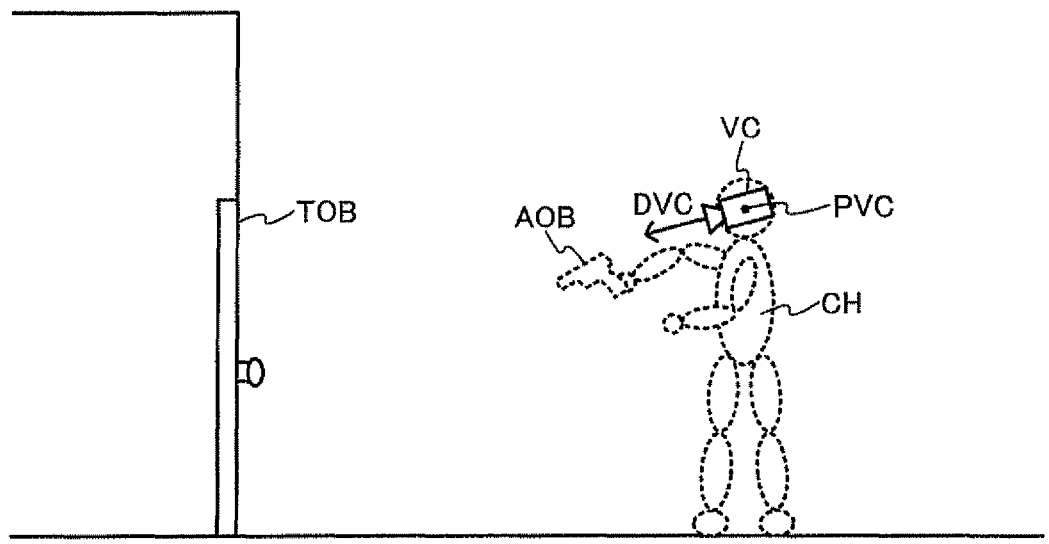
FIGS. 10A and 10B are views illustrative of a method that switches a viewpoint between a first-person viewpoint and a third-person viewpoint based on position information about a player.

For example, when the player PL has approached the display section 190 (see FIG. 3A), the viewpoint is set to a first-person viewpoint (see FIG. 10A). In this case, the virtual camera VC is disposed at a viewpoint position PVC of the character CH (i.e., a virtual character that is not displayed), for example. The direction of the virtual camera VC is set to a direction DVC.

Figure 10B:
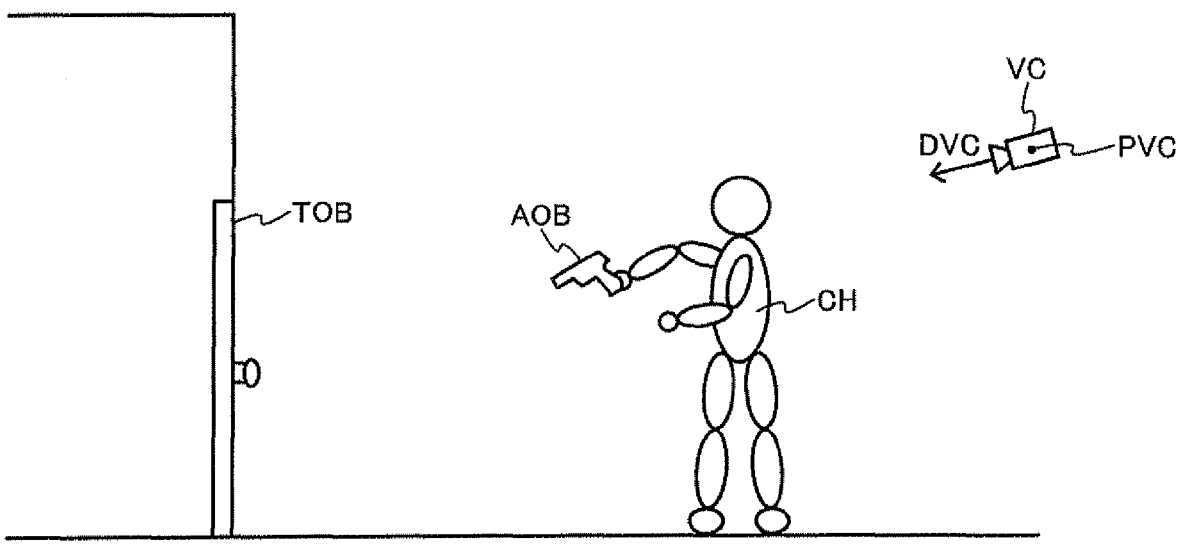

When the player PL has moved away from the display section 190 (see FIG. 4A), the viewpoint is set to a third-person viewpoint (see FIG. 10B). In this case, the virtual camera VC is disposed at the position PVC behind the character CH. The direction of the virtual camera VC is set to the direction DVC.

Specifically, the virtual camera VC is set to a first-person viewpoint when the distance between the display section 190 and the player PL is short, and set to a third-person viewpoint when the distance between the display section 190 and the player PL is long, as shown in FIGS. 10A and 10B.

Figure 11A:
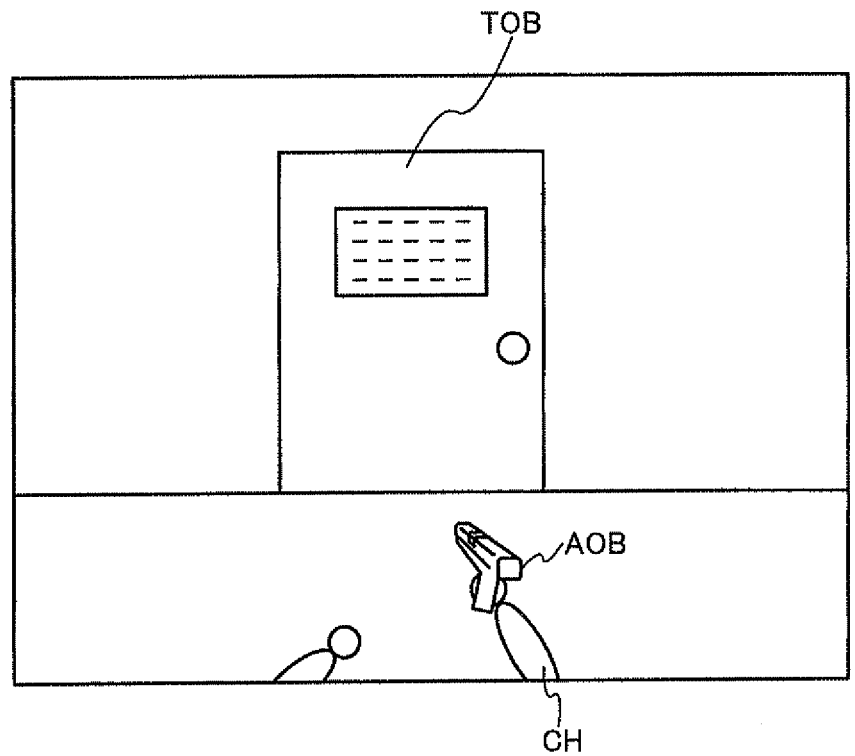
FIGS. 11A and 11B show examples of an image generated according to one embodiment of the invention.

An image shown in FIG. 11A is generated when the virtual camera VC is set to a first-person viewpoint. Specifically, an image in which the viewpoint approaches the target object TOB positioned in front of the character CH is generated. This makes it possible for the player to easily obtain detailed information about the target object TOB. In FIG. 11A, the player can read characters written on the target object TOB (door), for example. In the first-person viewpoint image shown in FIG. 11A, the hand of the character CH and a weapon AOB held by the character CH are also displayed. The player can easily perform a first-person viewpoint operation as a result of displaying these objects.

Figure 11B:
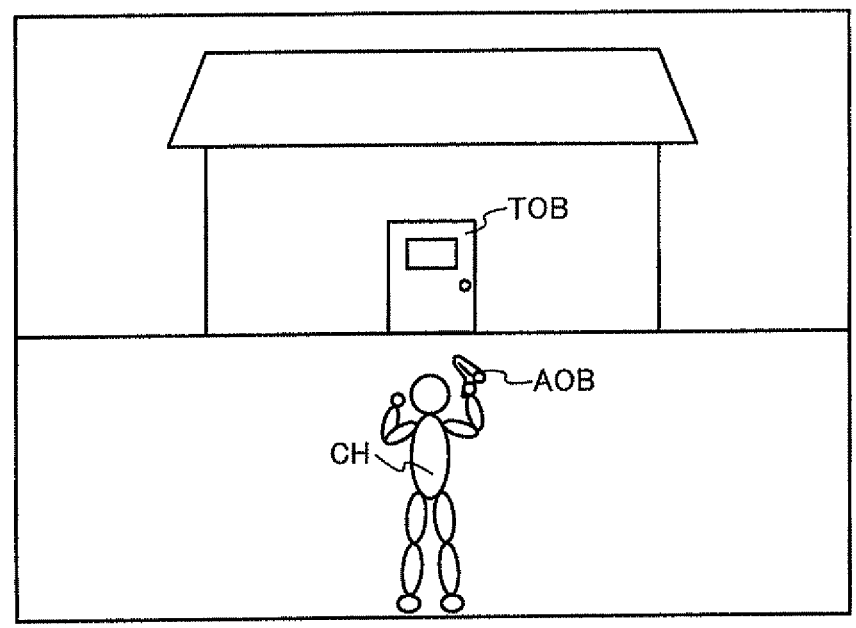

An image shown in FIG. 11B is generated when the virtual camera VC is set to a third-person viewpoint. Specifically, an image in which the viewpoint is positioned away from the target object TOB is generated. This makes it possible for the player to widely observe the state in front of the target object TOB and the state around the character CH.

Therefore, when the player PL desires to closely observe the state around (e.g., in front of) the character CH, the player PL can observe an image as shown in FIG. 11A by approaching the display section 190. When the player PL desires to widely observe the state around the character CH, the player PL can observe an image as shown in FIG. 11B by moving away from the display section 190. This makes it possible to implement a viewpoint setting switch process that is intuitive and convenient for the player. Since the viewpoint setting switch process is automatically performed based on the image information from the image sensor ISE, and does not require a game operation using a game controller, game operations performed by the player can be simplified.

Figure 12A:
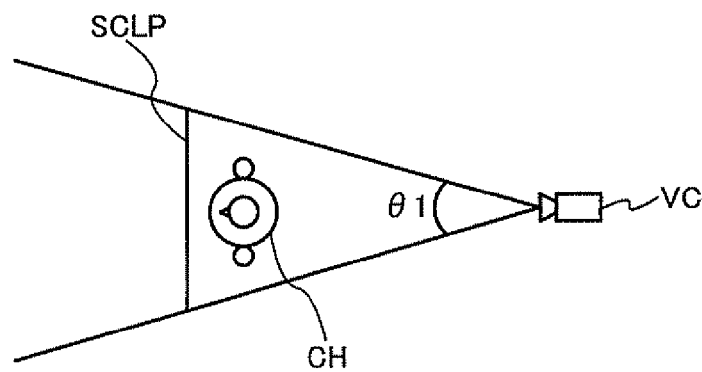
FIGS. 12A to 12C are views illustrative of a method that switches a viewpoint between a first-person viewpoint and a third-person viewpoint by controlling the angle of view of a virtual camera.
Figure 12B:
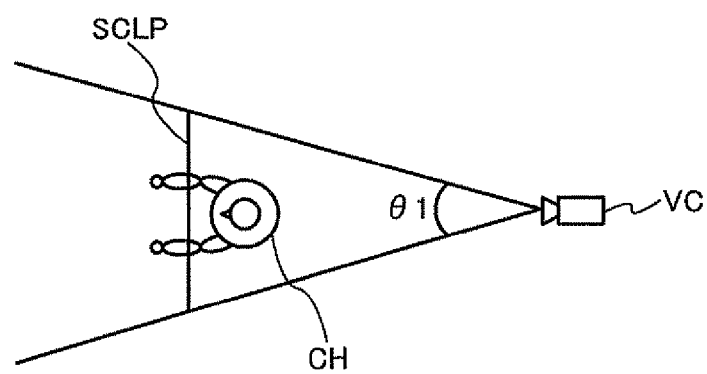
Figure 12C:
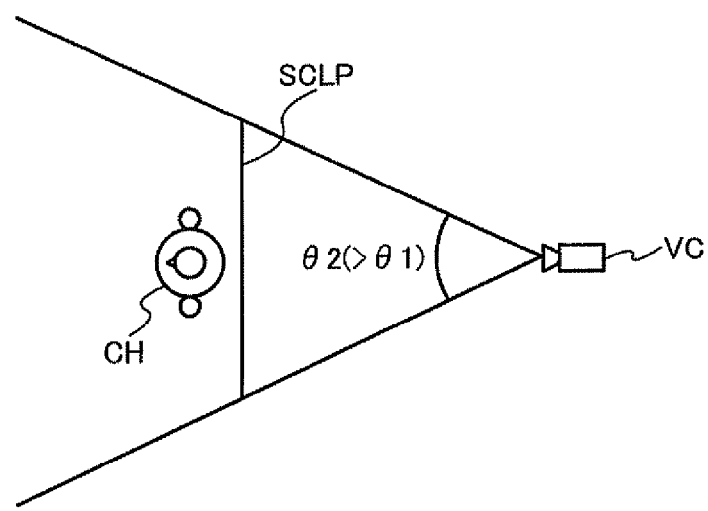

Note that the first-person viewpoint image and the third-person viewpoint image shown in FIGS. 11A and 11B may be generated by controlling the angle of view of the virtual camera VC as shown in FIGS. 12A to 12C.

For example, the first-person viewpoint image shown in FIG. 11A may be generated by setting the angle of view of the virtual camera VC to the narrow angle θ1 (see FIG. 12A). The third-person viewpoint image shown in FIG. 11B may be generated by setting the angle of view of the virtual camera VC to the wide angle θ2 (see FIG. 12C).

When setting the virtual camera VC to a first-person viewpoint by controlling the angle of view of the virtual camera VC, it is desirable to perform a clipping process that excludes at least part of the character CH from the drawing target. As shown in FIG. 12A, a front clipping plane SCLP (virtual camera-side clipping plane) of the view volume (viewport) is set to be deeper than the character CH, for example. Therefore, the character CH is not present within the view volume (i.e., is excluded from the drawing target), so that a first-person viewpoint image can be generated.

When generating a first-person viewpoint image, the front clipping plane SCLP may be set around the position of the hand of the character CH, as shown in FIG. 12B. In this case, the hand (part of the arm) of the character CH and an item (e.g., weapon) held by the character CH are present within the view volume (i.e., set as the drawing target). On the other hand, part of the character CH (at least part of the character in a broad sense) other than the hand of the character CH and the item held by the character CH is excluded from the drawing target. This makes it possible to generate a first-person viewpoint image in which the hand of the character CH and the weapon AOB are displayed (see FIG. 11A).

When generating a third-person viewpoint image, the front clipping plane SCLP may be set in front of the character CH, as shown in FIG. 12C. Therefore, the character CH is present within the view volume (i.e., set as the drawing target). This makes it possible to generate a third-person viewpoint image (see FIG. 11B).

The method according to this embodiment controls the virtual camera so that the distance between the character and the virtual camera in the depth direction, the height direction, or the transverse direction in the object space changes based on the position information about the player, as described above. This makes it possible to implement novel viewpoint control. Since the virtual camera is automatically controlled based on the image information from the image sensor without requiring an operation using a game controller, operations performed by the player can be simplified.

According to this embodiment, when the player has approached the display section, the virtual camera approaches the character, or the angle of view of the virtual camera is decreased, so that a zoom-in image is generated, as described with reference to FIGS. 3A to 7. When the player has moved away from the display section, the virtual camera moves backward from the character, or the angle of view of the virtual camera is increased, so that a zoom-out image is generated. This makes it possible to implement viewpoint setting control that is intuitive and convenient for the player.

According to this embodiment, when the player has moved in the transverse direction relative to the display section, the virtual camera moves relative to the character in the object space in the direction opposite to the moving direction of the player, as described with reference to FIGS. 8A to 8D. This makes it possible to generate an image with a viewpoint setting suitable for a war game, a shooting game, or the like (see FIG. 9) merely based on the movement of the player in the transverse direction (i.e., simple operation).

According to this embodiment, the viewpoint is switched between a first-person viewpoint and a third-person viewpoint based on the distance between the player and the display section, as described with reference to FIGS. 10A and 10B. Therefore, the viewpoint is switched between a first-person viewpoint and a third-person viewpoint merely based on the movement of the player in the forward/backward direction without using a game controller provided with a viewpoint switch button or the like. This makes it possible to provide an intuitive and convenient operation interface environment.

According to this embodiment, the position information about the player is acquired based on the depth information shown in FIG. 2B, and the virtual camera is controlled as described above based on the acquired position information. The position information about the player viewed from the display section (image sensor) can be efficiently acquired by a simple process by utilizing the depth information. Specifically, when the player has moved in the depth direction or the transverse direction relative to the display section, the position information about the player can be easily specified using the depth information, and virtual camera control described with reference to FIGS. 3A to 12C can be implemented based on the specified position information. Moreover, skeleton information about the player can be calculated based on the depth information, and the position of a thing held by the player or part of the player can be specified, or the image process range can be set using the calculated skeleton information (described later). Note that the position information about the player may be acquired without using the depth information. For example, the image area of the player in the color image information may be calculated, and the information about distance between the display section and the player may be acquired as the position information about the player. Alternatively, the information about distance between the display section and the player may be acquired as the position information about the player using a ranging sensor that can measure the distance from the player.

2.2 Image Generation Based on Play Motion Determination

In this embodiment, a different image is generated based on whether the player has made a play motion with the right hand or the left hand.

For example, a player enjoys a war game, a shooting game, or the like by causing a character that holds a weapon (e.g., gun) to defeat an enemy (i.e., target). A player may be right-handed or left-handed. A right-handed player normally attacks an enemy while holding a weapon with the right hand, and a left-handed player normally attacks an enemy while holding a weapon with the left hand.

In this embodiment, whether the player has made a play motion with the right hand or the left hand is determined. The term "play motion" used herein refers to a motion made by the player so that the game progresses. Examples of the play motion include an attack motion, a defense motion, a movement instruction motion, a target-aiming motion, a catching motion, a throwing motion, a holding motion, a hitting motion, an instruction motion, and the like. The player makes a play motion with one hand (i.e., right hand or left hand) in principle, but may make a play motion with both hands. When the player makes a play motion with both hands, a hand that is mainly used to make the motion is considered to be the hand used to make a play motion. For example, when the player holds a sword with the right hand, and holds a shield with the left hand, the right hand is considered to be the hand used to make a play motion. When the player holds a weapon with a high attack capability with the right hand, and holds a weapon with a low attack capability with the left hand, the right hand is considered to be the hand used to make a play motion. For example, the hand used to make a play motion is the player's dominant hand.

In this embodiment, a different image is generated based on whether the player has made a play motion with the right hand or the left hand, and displayed on the display section.

Figure 13A:
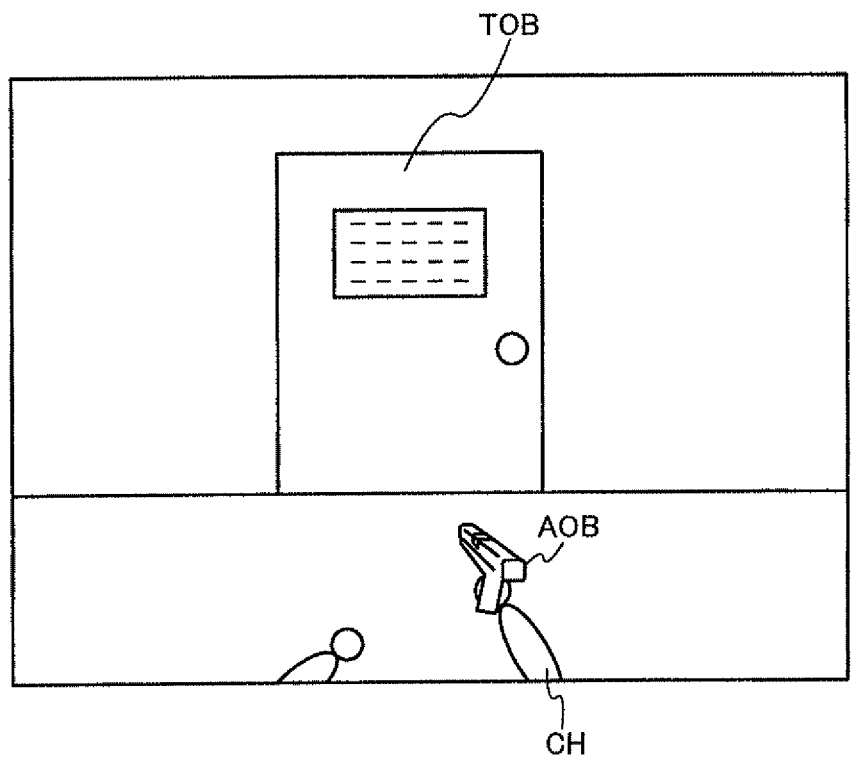
FIGS. 13A and 13B show examples of an image generated according to one embodiment of the invention.
Figure 13B:
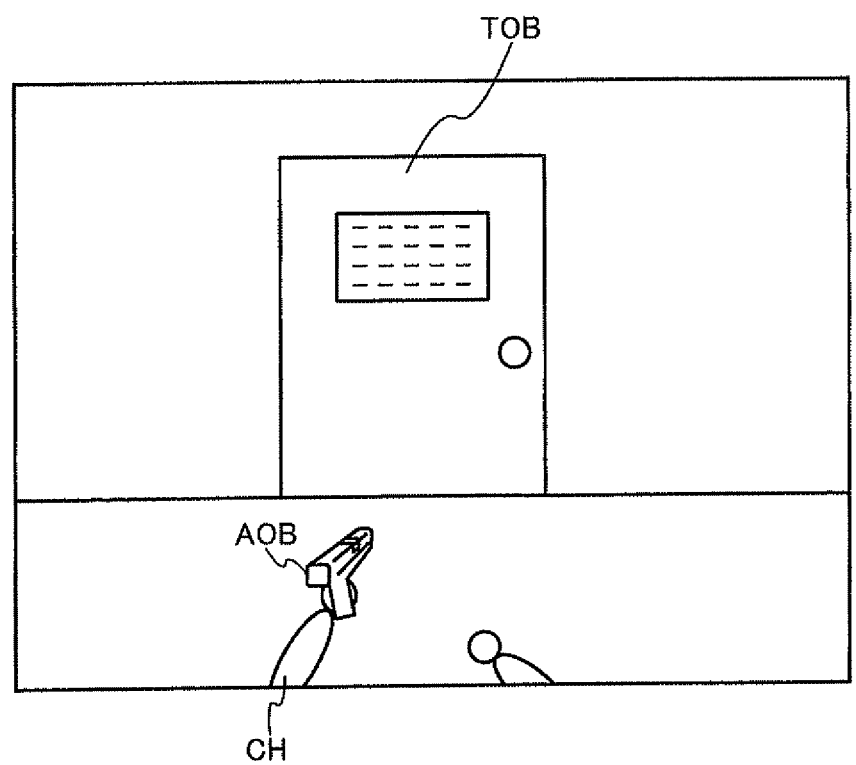

FIG. 13A shows an example of an image generated when the player has made a play motion with the right hand, and FIG. 13B shows an example of an image generated when the player has made a play motion with the left hand. These images are examples of a first-person viewpoint image.

In FIG. 13A, the character CH holds the weapon AOB with the right hand, and positions the right hand forward from the left hand. For example, when the player is right-handed, the player is likely to make a play motion with the right hand forward from the left hand. Therefore, when such a posture/motion of the player has been detected based the image information from the image sensor, an image as shown in FIG. 13A is generated.

In FIG. 13B, the character CH holds the weapon AOB with the left hand, and positions the left hand forward from the right hand. For example, when the player is left-handed, the player is likely to make a play motion with the left hand forward from the right hand. Therefore, when such a posture/motion of the player has been detected based the image information from the image sensor, an image as shown in FIG. 13B is generated.

A different image is thus generated based on whether the player has made a play motion with the right hand or the left hand (see FIGS. 13A and 13B).

In this case, it is desirable to determine whether the player has made a play motion with the right hand or the left hand based on skeleton information about the player.

Figure 14:
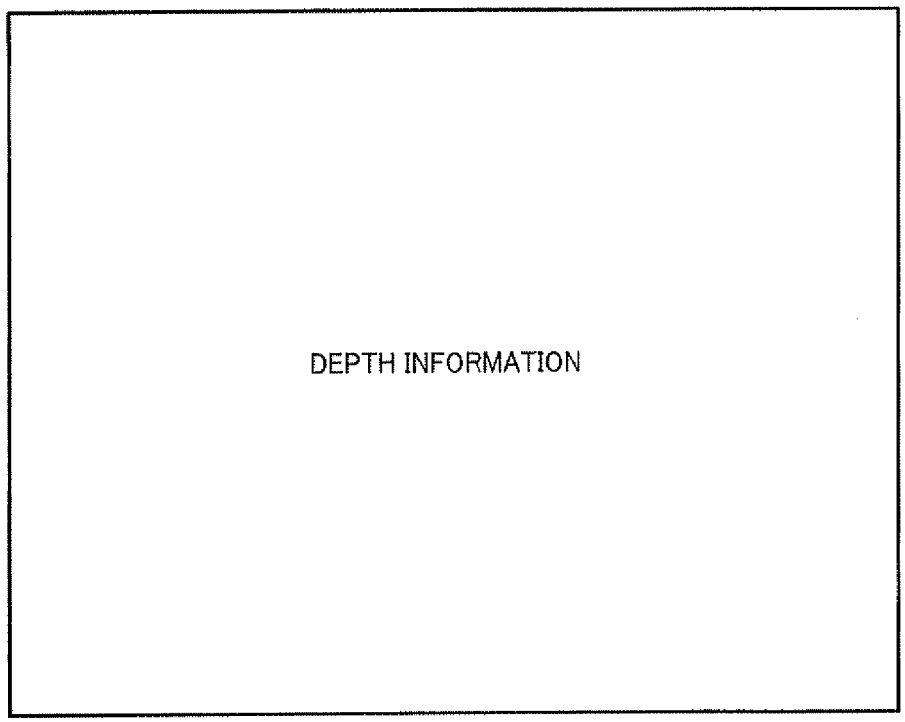
FIG. 14 is a view illustrative of a method that calculates skeleton information about a player based on depth information.
Figure 14:
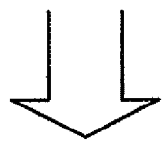
Figure 14:
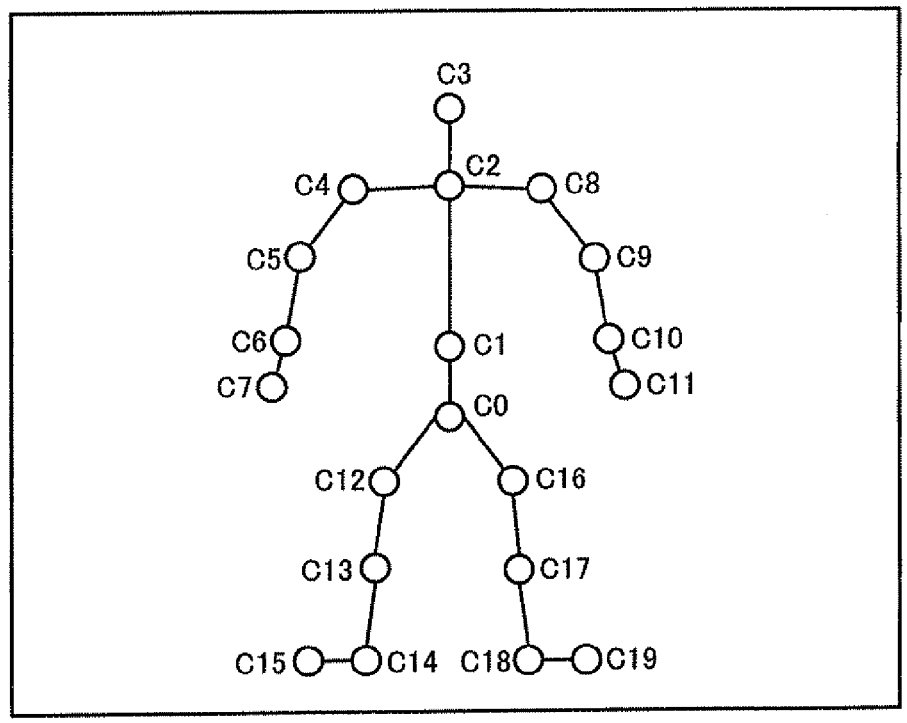

As shown in FIG. 14, skeleton information used to specify the motion of the player PL is acquired based on the image information (e.g., depth information shown in FIG. 2B). In FIG. 14, position information (three-dimensional coordinates) about joints C0 to C19 of a skeleton has been acquired as the skeleton information. The joints C0 to C10 correspond to the joints of the player PL captured by the image sensor ISE. When the whole body of the player PL is not captured by the image sensor ISE, the skeleton information that includes the position information about only the joints in the captured area is generated.

For example, the three-dimensional shape of the player PL or the like viewed from the image sensor ISE can be acquired using the depth information shown in FIG. 2B. The area of part (e.g., face) of the player PL can be specified by face image recognition or the like when using the color image information in combination with the depth information. Therefore, each part of the player PL and the joint position of each part are estimated based on the three-dimensional shape information and the like. The three-dimensional coordinate information about the joint position of the skeleton is calculated based on the two-dimensional coordinates of the pixel position of the depth information corresponding to the estimated joint position, and the depth information set to the pixel position to acquire the skeleton information shown in FIG. 14.

The motion (e.g., gesture) of the player PL can be specified in real time by utilizing the skeleton information, so that a novel operation interface environment can be implemented. Moreover, the skeleton information has high compatibility with the motion data about the character CH disposed in the object space. Therefore, the character CH can be caused to make a motion in the object space by utilizing the skeleton information as the motion data, for example.

In this embodiment, whether the player has made a play motion with the right hand or the left hand is determined using the skeleton information shown in FIG. 14. For example, when the joints C7 and C6 corresponding to the right hand are positioned forward from (i.e., positioned closer to the display section as compared with) the joints C11 and 10 corresponding to the left hand, it is determined that the player has made a play motion with the right hand. When the joints C11 and 10 corresponding to the left hand are positioned forward from the joints C7 and C6 corresponding to the right hand, it is determined that the player has made a play motion with the left hand. Alternatively, skeleton information used as a template when the player has made a play motion with the right hand is provided as right hand reference skeleton information, and skeleton information used as a template when the player has made a play motion with the left hand is provided as left hand reference skeleton information. A matching process is performed on the skeleton information about the player detected by the image sensor and the right hand reference skeleton information or the left hand reference skeleton information. Whether the player has made a play motion with the right hand or the left hand is determined using the results for the evaluation function of the matching process. In this case, the matching process may be performed across (over) a plurality of frames, for example.

A more accurate and appropriate determination process can be implemented by determining whether the player has made a play motion with the right hand or the left hand using the skeleton information obtained based on the depth information. Moreover, whether the player has made a play motion with the right hand or the left hand can be determined by effectively utilizing the skeleton information used to reproduce the motion of the character, for example.

In this embodiment, a different image may be generated based on whether the viewpoint (virtual camera) is set to a third-person viewpoint or a first-person viewpoint in addition to whether the player has made a play motion with the right hand or the left hand.

Figure 15A:
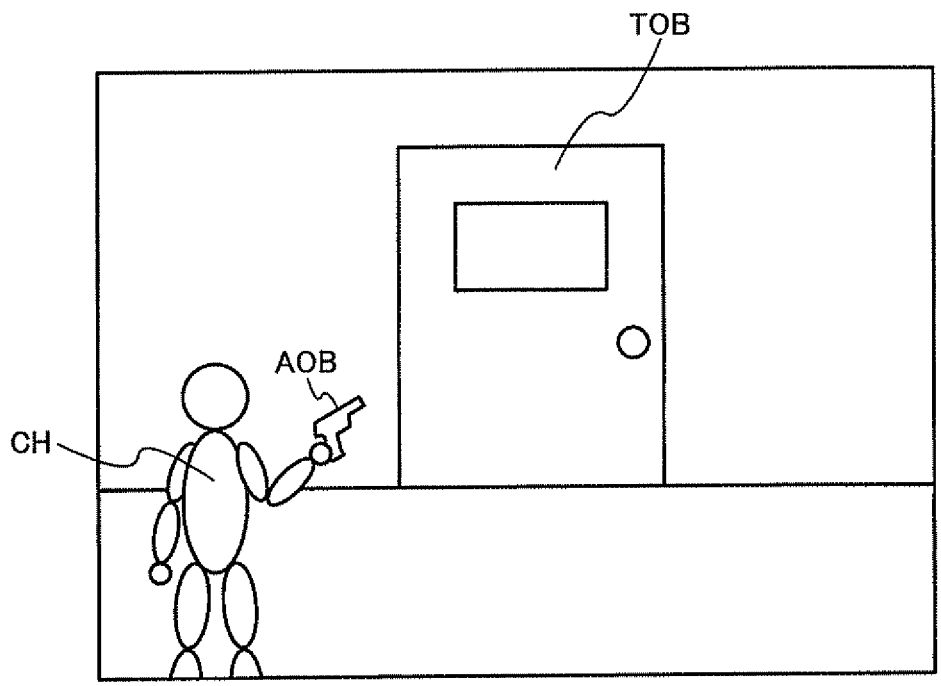
FIGS. 15A and 15B show examples of an image generated according to one embodiment of the invention.
Figure 15B:
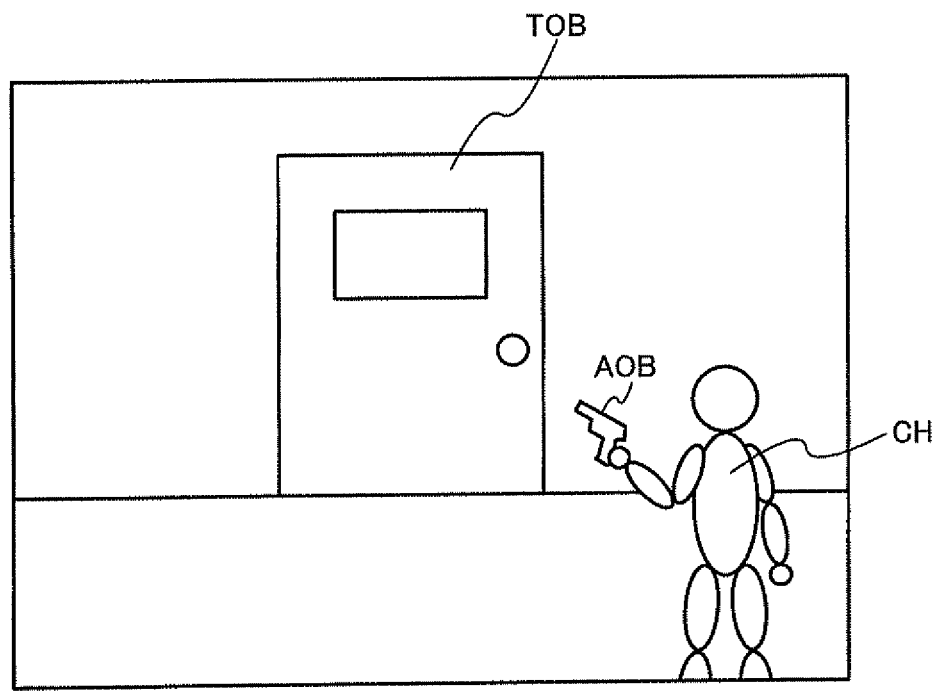

FIGS. 15A and 15B show examples of an image generated when the viewpoint is set to a third-person viewpoint. In FIG. 15A, it has been determined that the player has made a play motion with the right hand. FIG. 15A shows a case where a right-handed player has made a weapon holding motion with the right hand. In this case, an image in which the character CH is displayed on the left side of the screen of the display section is generated. An image in which the character CH makes an attack motion or an attack preparation motion while holding the weapon AOB with the right hand (dominant hand) is then generated.

In FIG. 15B, it has been determined that the player has made a play motion with the left hand. FIG. 15B shows a case where a left-handed player has made a weapon holding motion with the left hand. In this case, an image in which the character CH is displayed on the right side of the screen of the display section is generated. An image in which the character CH makes an attack motion or an attack preparation motion while holding the weapon AOB with the left hand (dominant hand) is then generated.

Specifically, when the player plays a war game, a shooting game, or the like, the player can easily observe (determine) other objects due to an increase in field of view when the character CH is displayed on the left side or the right side of the screen as compared with the case where the character CH is displayed at the center of the screen. This facilitates game play.

When a right-handed player plays the game while holding a weapon with the right hand, it is likely that the right-handed player easily plays the game when the character CH is displayed on the left side of the screen, and other objects (map and enemy) are displayed on the right side of the screen (see FIG. 15A). Therefore, when it has been determined that the player has made a play motion with the right hand (i.e., the player is right-handed), a third-person viewpoint image in which the character CH is displayed on the left side of the screen is generated (see FIG. 15A).

When a left-handed player plays the game while holding a weapon with the left hand, it is likely that the left-handed player easily plays the game when the character CH is displayed on the right side of the screen, and other objects (map and enemy) are displayed on the left side of the screen (see FIG. 15B). Therefore, when it has been determined that the player has made a play motion with the left hand (i.e., the player is left-handed), a third-person viewpoint image in which the character CH is displayed on the right side of the screen is generated (see FIG. 15B).

This makes it possible to display an image having a screen configuration appropriate for the player's dominant hand even if the player is left-handed or right-handed.

When generating a first-person viewpoint image, it is desirable to employ a screen configuration opposite to the screen configuration shown in FIGS. 15A and 15B.

Figure 16A:
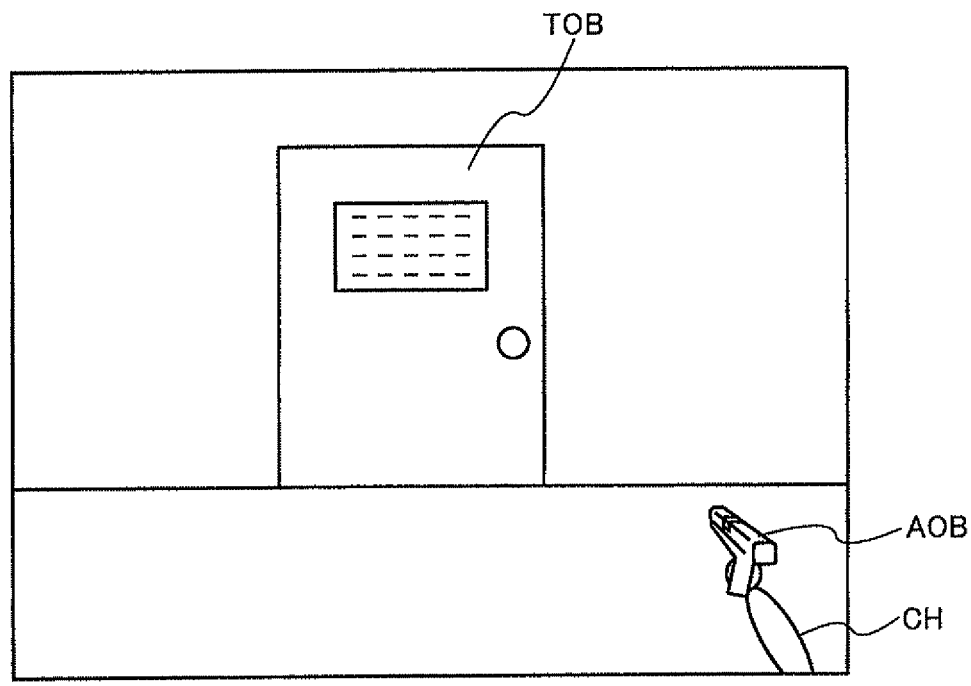
FIGS. 16A and 16B show examples of an image generated according to one embodiment of the invention.
Figure 16B:
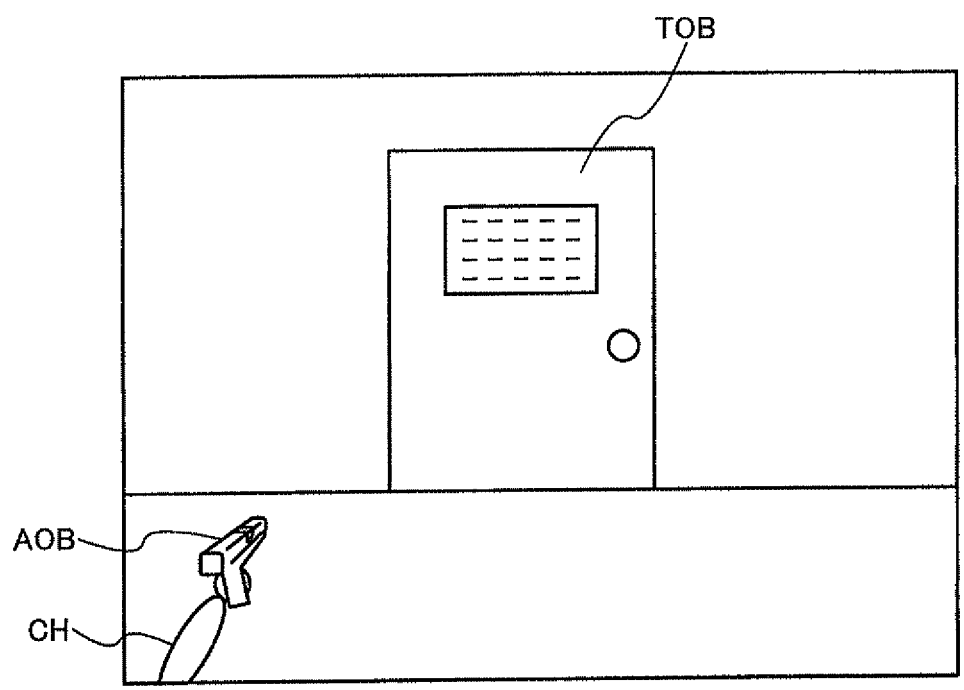

FIGS. 16A and 16B show examples of an image generated when the viewpoint is set to a first-person viewpoint. In FIG. 16A, it has been determined that the player has made a play motion with the right hand. In this case, an image in which the hand of the character CH (part of the character in a broad sense) and the weapon AOB are displayed on the right side of the screen of the display section is generated. An image in which the character CH makes an attack motion or an attack preparation motion while holding the weapon AOB with the right hand (dominant hand) is then generated.

In FIG. 16B, it has been determined that the player has made a play motion with the left hand. In this case, an image in which the hand of the character CH (part of the character in a broad sense) and the weapon AOB are displayed on the left side of the screen of the display section is generated. An image in which the character CH makes an attack motion or an attack preparation motion while holding the weapon AOB with the left hand (dominant hand) is then generated.

Specifically, the display position of the hand of the character and the like shown in FIGS. 16A and 16B (first-person viewpoint) is opposite to that shown in FIGS. 15A and 15B (third-person viewpoint). When generating a first-person viewpoint image, it is likely that the screen configuration shown in FIGS. 16A and 16B allows the player to easily play the game. According to this embodiment, a game image that allows the player to easily play the game can be generated, even when the viewpoint is switched between a third-person viewpoint and a first-person viewpoint, by employing such a screen configuration that the display position of the hand of the character and the like is reversed depending on whether the viewpoint is set to a third-person viewpoint and a first-person viewpoint.

2.3 Rendering Process Based on Direction Information About Thing Held by Player and the Like In this embodiment, direction information, color information, shape information, and the like about a thing held by the player PL or part of the player PL are acquired as rendering information by performing an image process based on the image information from the image sensor ISE.

Figure 17A:
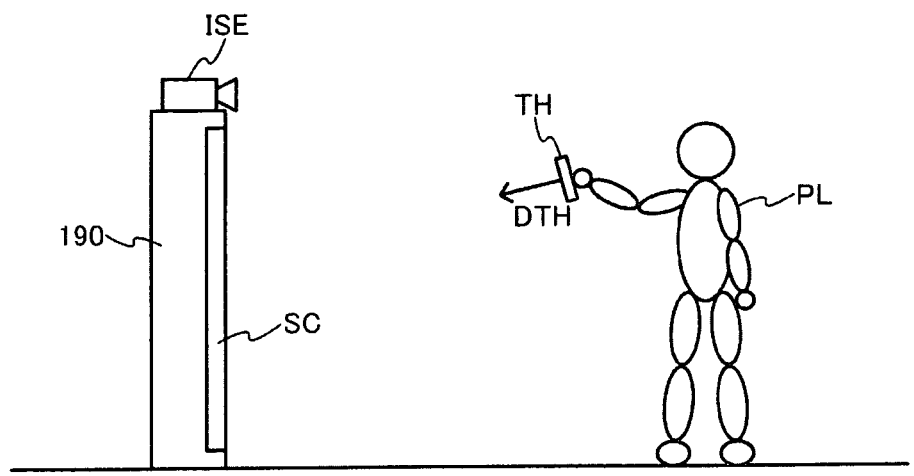
FIGS. 17A and 17B are views illustrative of a method that acquires direction information and the like about a thing held by a player or the like as rendering information.

In FIG. 17A, the player PL holds (possesses) a tabular (rectangular parallelepiped or rectangular) thing TH while facing the surface of the thing TH toward the display section 190. In this case, the image sensor ISE acquires image information (e.g., color image information and depth information) shown in FIG. 17B.

Figure 17B:
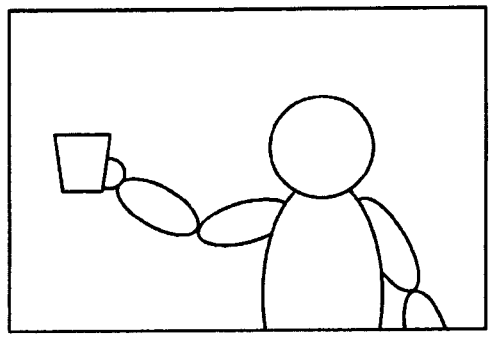
Figure 17B:
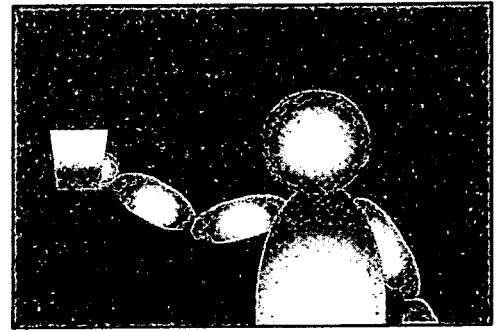

The color information and the shape information about the thing TH (or part) are specified based on the color image information shown in FIG. 17B. For example, the color, the rectangular parallelepiped shape, and the quadrangular surface shape of the thing TH can be specified based on the color image information shown in FIG. 17B. The direction DTH (normal direction) of the surface of the thing TH can be specified based on the degree of perspective of the image.

The direction information (DTH) and the shape information (rectangular parallelepiped or quadrangle) about the thing TH (or part) can also be specified using the depth information shown in FIG. 17B. Specifically, the three-dimensional shape of the player PL and the thing TH viewed from the image sensor ISE can be extracted using the depth information. Therefore, the direction DTH (normal direction) of the surface of the thing TH can be specified based on the depth information (e.g., the slope of the depth values) about the quadrangular surface area of the thing TH. The rectangular parallelepiped shape and the quadrangular surface shape of the thing TH can also be specified based on the depth information.

In this embodiment, the rendering process is performed using the direction information, the color information, or the shape information about the thing TH or the like thus specified as the rendering information. The following description mainly illustrates an example in which the rendering process or the hit calculation process is performed using the direction information, the color information, or the shape information about the thing TH held by the player PL. Note that the rendering process or the hit calculation process may be performed using the direction information, the color information, or the shape information about part (e.g., hand, foot, arm, or head) of the player PL.

Figure 18A:
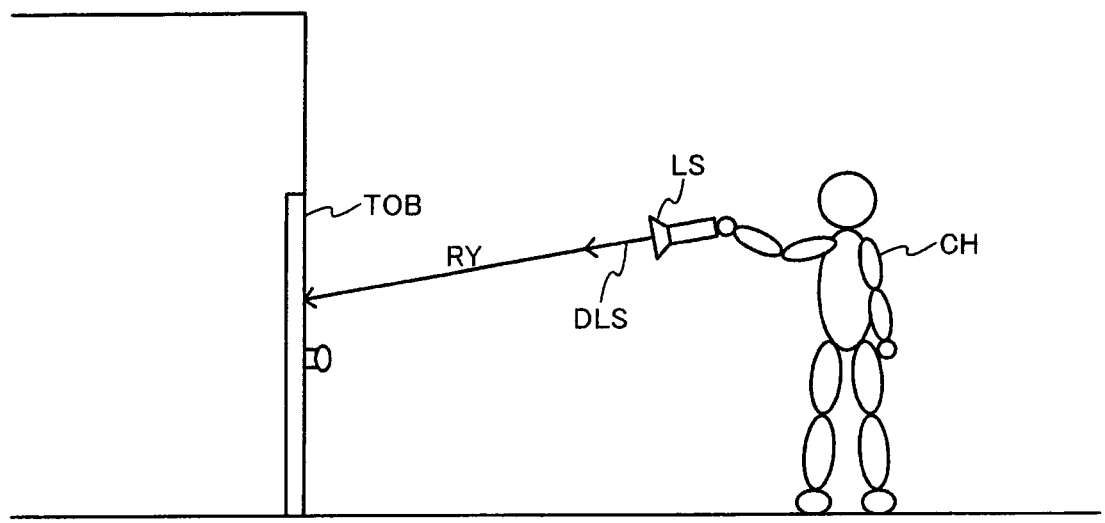
FIGS. 18A and 18B are views illustrative of a rendering process performed using the acquired rendering information.
Figure 18B:
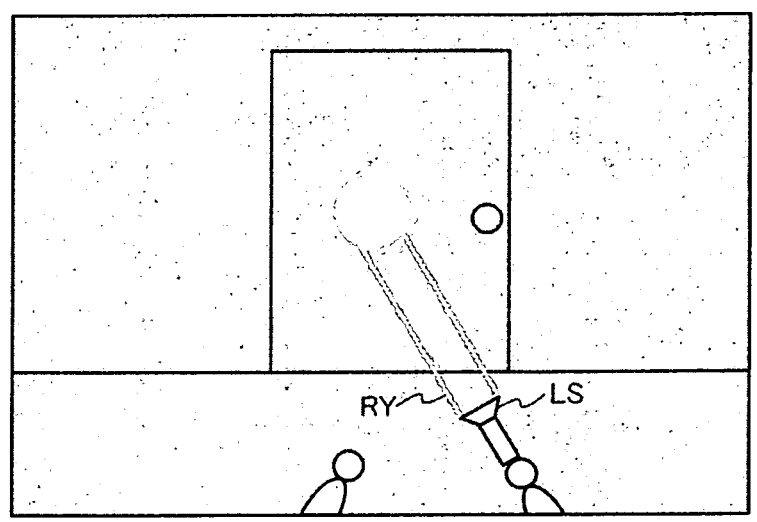

In FIG. 18A, a light source LS is set at a position corresponding to the thing TH held by the player PL, for example. Specifically, the player PL holds the thing TH with the right hand in FIG. 17A. In FIG. 18A, the light source LS (e.g., flashlight) is disposed corresponding to the right hand of the character CH. A light source direction DLS of the light source LS is set to coincide with the direction DTH of the thing TH acquired in FIG. 17A. A shading process is performed on the target object TOB using light RY emitted in the light source direction DLS, and the image is rendered. An image that is shaded due to the light RY emitted from the light source LS and the like is thus generated (see FIG. 18B), and displayed on the display section 190.

Figure 19A:
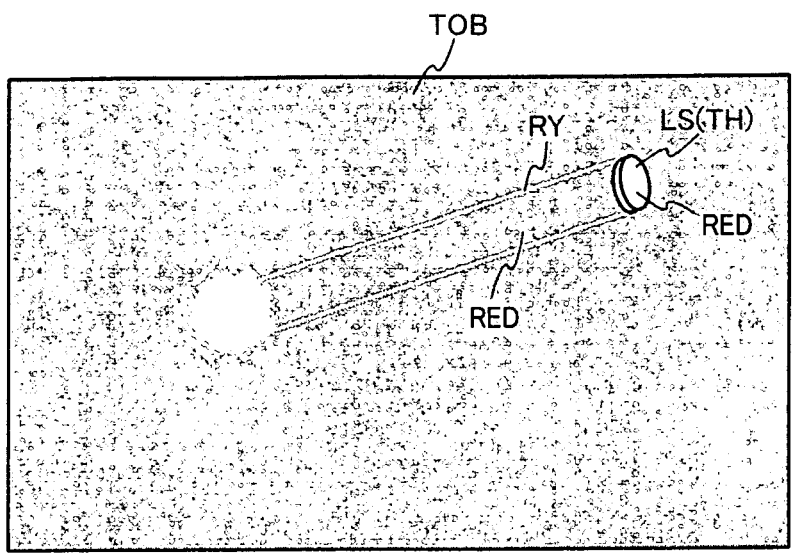
FIGS. 19A and 19B are views illustrative of a method that reflects shape information and color information about a thing held by a player or the like in a rendering process.

In this embodiment, an image that reflects the color information and the shape information about the thing TH is generated. In FIG. 19A, the thing TH has a disk shape, for example. Therefore, a light source LS having a circular light-emitting plane is set, and an image of light RY corresponding to the light source LS, and a shading image due to the light RY are generated. Since the color of the thing TH is red, the color of the light RY is set to be red, and the red light RY is applied to an image of the target object TOB.

Figure 19B:
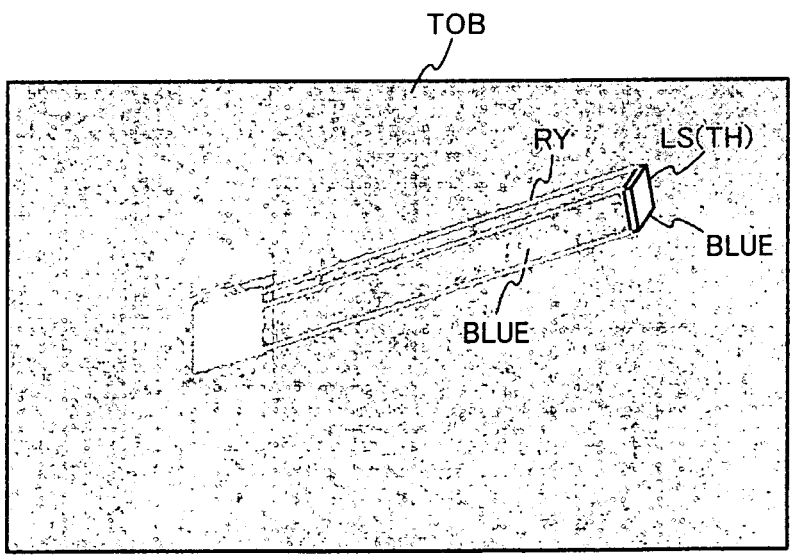

In FIG. 19B, the thing TH has a rectangular parallelepiped shape. Therefore, a light source LS having a rectangular light-emitting plane is set, and an image of light RY corresponding to the light source LS, and a shading image due to the light RY are generated. Since the color of the thing TH is blue, the color of the light RY is set to be blue, and the blue light RY is applied to an image of the target object TOB.

Figure 20:
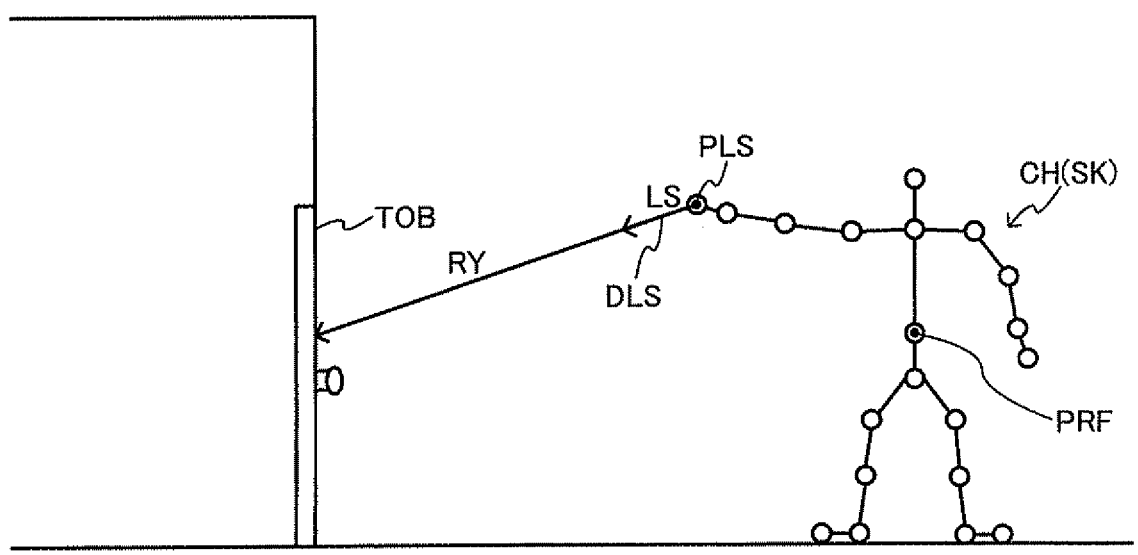
FIG. 20 is a view illustrative of a method that specifies the position of a light source or the like based on skeleton information about a player.

In this embodiment, the position of the light source LS is specified using the skeleton information described with reference to FIG. 14. As shown in FIG. 20, position information PRF (representative position information) about the character CH corresponding to the player PL is calculated. For example, a movement calculation process for moving the character CH in the object space is performed based on the motion of the player PL detected by the image sensor ISE that instructs the movement of the character CH, operation information from a game controller, and the like. The position information PRF about the character CH in the world coordinate system of the object space is sequentially calculated by the movement calculation process. The position of the hand or the like of the character CH corresponding to the player PL is calculated based on the position information PRF in the world coordinate system, and the joint position information in a local coordinate system indicated by the skeleton information calculated as shown in FIG. 14. As shown in FIG. 20, the position PLS of the light source LS is set to the position of the hand or the like thus calculated. The rendering process (shading process) is then performed using the light source LS disposed at the position PLS.

This makes it possible to specify the position PLS of the light source LS can be specified by effectively utilizing the skeleton information that specifies the motion of the player. An image can then be generated so that the light source LS is disposed at the position of the thing TH held by the player PL, and an area around the character CH corresponding to the player PL is illuminated by light emitted from the light source LS.

A case where the direction information, the shape information, and the like about a thing held by the player PL or part of the player PL are acquired using the depth information shown in FIG. 17B has been described above. Note that this embodiment is not limited thereto. For example, the direction information and the like about a thing held by the player or part of the player may be acquired using only the color image information.

The direction information about a thing held by the player or part of the player may also be acquired based on the skeleton information acquired as shown in FIG. 14.

Figure 21A:
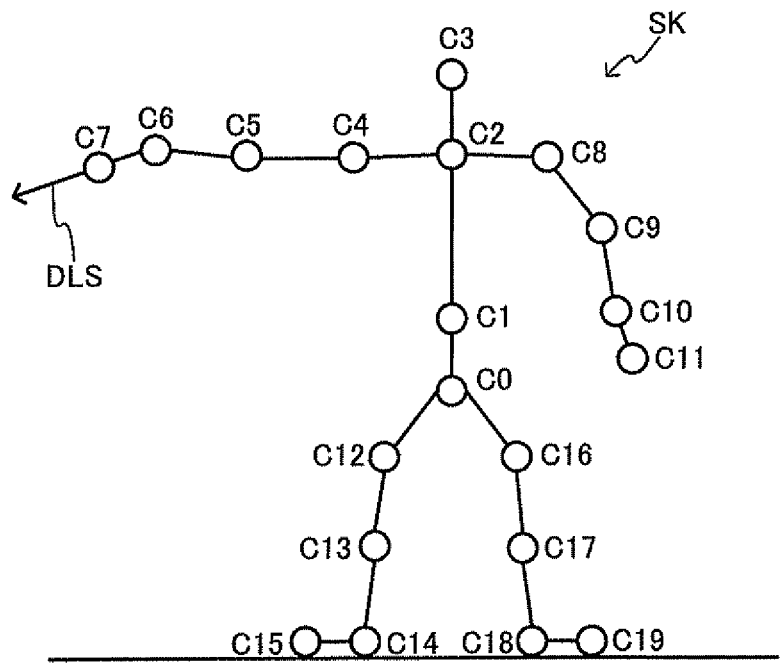
FIGS. 21A and 21B are views illustrative of a method that acquires direction information about a thing held by a player or the like using skeleton information about a player.
Figure 21B:
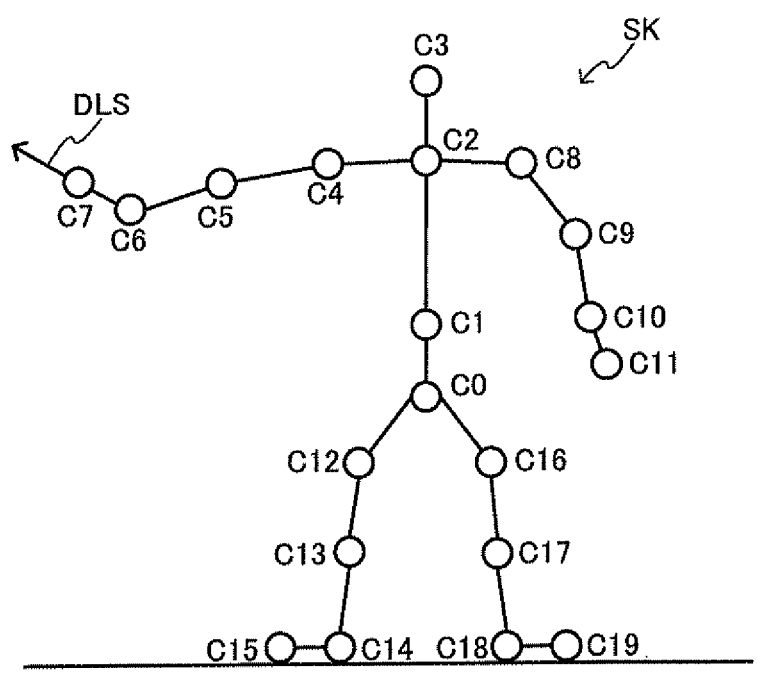

In FIG. 21A, the movement of the player PL has been acquired as information about a skeleton SK, for example. In this case, the direction of the thing TH or the like is specified based on the positions of the joints C6, C7, and the like corresponding to the hand of the player PL, and set as the light source direction DLS. In FIG. 21B, the direction of the thing TH or the like is similarly specified based on the positions of the joints C6, C7, and the like corresponding to the hand of the player PL, and set as the light source direction DLS. In this case, the positions of the joints C6 and C7 can be acquired based on the skeleton information.

According to the above configuration, when the player PL has changed the direction of the thing TH by moving his hand, the change in direction can be detected based on the skeleton information. Specifically, the change in direction can be detected based on the positions of the joints C6 and C7 acquired based on the skeleton information. As shown in FIGS. 21A and 21B, the light source direction DLS changes due to the change in the direction of the thing TH, and the emission direction of the light RY emitted from the light source LS also changes. Therefore, when the player PL has changed the direction of the thing TH by moving his hand, the direction of light in the game image also changes. This makes it possible for the player PL to illuminate (observe) the desired direction. Specifically, a novel game effect can be implemented by effectively utilizing the skeleton information acquired using the depth information.

In this embodiment, the processing area of the image process may be specified using the skeleton information acquired as shown in FIG. 14.

Figure 22A:
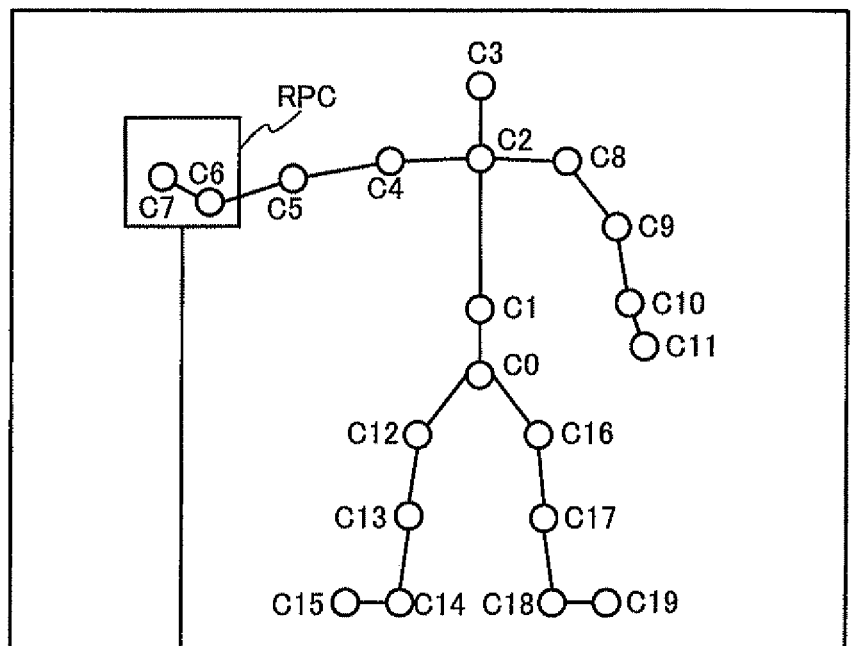
FIGS. 22A and 22B are views illustrative of a method that sets a processing area of an image process using skeleton information about a player.

In FIG. 22A, the positions of the joints C7 and the like corresponding to the hand of the player PL are specified based on the skeleton information, for example. An image area including the positions of the joints C7 and the like thus specified is set to be a processing area RPC of the image process, and the image process is performed on the depth information or the color image information corresponding to the processing area RPC. Specifically, when calculating the direction information, the color information, and the shape information about a thing held by the player PL or part of the player PL, the image process is performed on (using) the color image information and the depth information included in the processing area RPC.

This makes it unnecessary to perform the image process on the entire area (i.e., it suffices to perform the image process on the processing area RPC that is smaller than the screen size). Therefore, the processing load imposed by the image process can be reduced, and the rendering information (e.g., direction information) about a thing held by the player or part of the player can be acquired with a reduced processing load.

According to the above method, when the player has moved a thing held by the player or part (e.g., hand) of the player, the direction information, the color information, and the shape information about the thing or part are acquired as the rendering information. The rendering process is then performed using the rendering information, and an image displayed to the player is generated. Therefore, the movement of the player is intuitively reflected in the game image, so that an unprecedented game image can be generated.

In this case, when the player has held and moved an appropriate thing, a light source that reflects the shape, the color, and the like of the thing is set in the object space, and an image of light emitted from the light source, and an image of an object illuminated by light emitted from the light source are generated. As shown in FIGS. 19A and 19B, an image of red light and an image illuminated by red light are generated when the thing is a red object, and an image of blue light and an image illuminated by blue light are generated when the thing is a blue object, for example. This makes it possible to implement a novel game effect and the like.

Figure 22B:
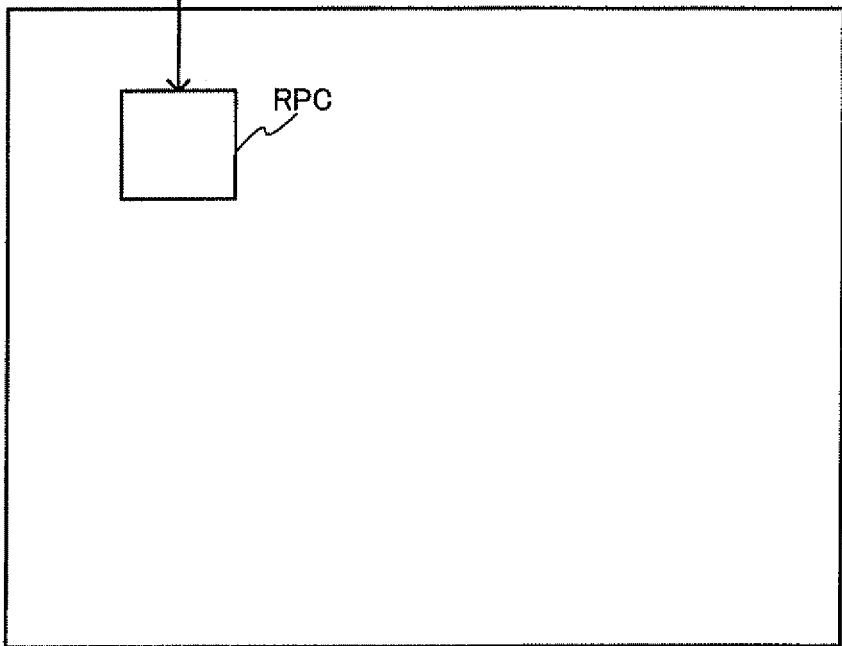

The position of the light source can be easily specified (see FIG. 20), and the light source direction can also be easily specified (see FIGS. 21A and 21B) by utilizing the skeleton information described with reference to FIG. 14. Moreover, the processing area of the image process for specifying the direction information and the like about the thing held by the player can be limited to a narrow area, as described with reference to FIGS. 22A and 22B, so that the processing load can be reduced.

2.4 Hit Calculation Process Based on Direction Information and the like About Thing Held by Player A case where the rendering process is performed using the direction information and the like about a thing held by the player or part of the player as the rendering information has been described above. Note that the hit calculation process may be performed using the direction information and the like as the hit calculation information.

Figure 23A:
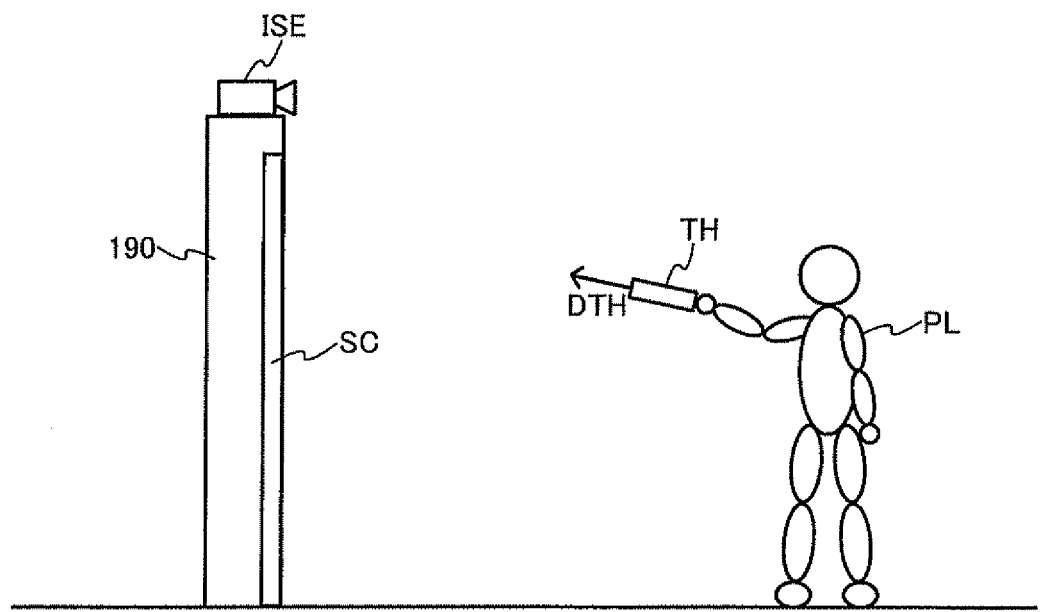
FIGS. 23A and 23B are views illustrative of a method that acquires direction information or the like about a thing held by a player or the like as hit calculation information.

In FIG. 23A, the image process is performed based on the image information from the image sensor ISE, and at least one of the direction information and the shape information about the thing TH held by the player PL (or part of the player PL) is acquired as the hit calculation information. For example, the direction DTH of the thing TH is acquired as the hit calculation information.

Figure 23B:
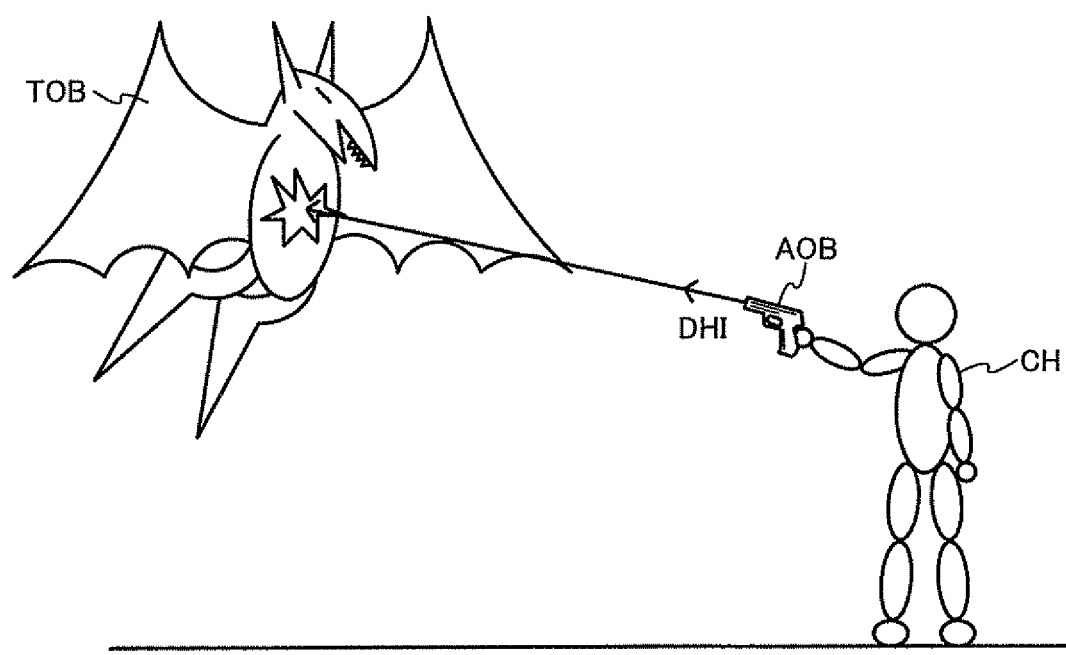

In this case, the hit calculation process is performed based on the hit calculation information. In FIG. 23B, the character CH corresponding to the player PL has moved in the object space, and encountered a target object TOB (enemy). In this case, when the player PL has aimed the thing TH at the target object TOB (see FIG. 23A), a bullet is fired at the target object TOB from the weapon AOB held by the character CH corresponding to the thing TH (see FIG. 23B). Specifically, a bullet (e.g., a bullet fired from a pistol or a ray emitted from a ray gun) is fired in a trajectory direction DHI specified by the direction DTH of the thing TH shown in FIG. 23A. A hit calculation process that determines whether or not the trajectory direction DHI intersects the target object TOB is performed, and an image is generated based on the result of the hit calculation process. Specifically, when it has been determined that the bullet has hit the target object TOB, an effect image that indicates that the bullet has hit the target object TOB is generated.

According to the above configuration, when the player has held an appropriate thing, and aimed the thing at the target object, a bullet is fired from a weapon (e.g., pistol or ray gun) corresponding to the thing held by the player, and hits the target object (enemy). This makes it possible to provide the player with an intuitive and convenient operation interface environment. Moreover, a shooting game shown in FIGS. 23A and 23B can be implemented without using a dedicated game controller.

According to this embodiment, it is possible to implement a hit calculation process that reflects the shape of a thing held by the player or part of the player. For example, the shape of each thing or part is linked to each weapon in advance. The shape of the thing held by the player or part of the player is recognized (detected) based on the image information from the image sensor. A weapon is selected based on the shape recognition result, and an image of the selected weapon is displayed in the game image. A bullet is then fired from the weapon at the target object. For example, when the player holds a short thing, an image in which the character holds a pistol, and fires a bullet from the pistol is generated. When the player holds a long thing, an image in which the character holds a rifle, and fires a bullet from the rifle is generated. This makes it possible to generate various game images depending on the shape of the thing held by the player, so that an unprecedented game effect can be implemented.

When performing the hit calculation process shown in FIGS. 23A and 23B, it is desirable to acquire the direction information and the shape information about a thing held by the player or part of the player as the hit calculation information based on the depth information acquired by the image sensor in the same manner as in FIG. 17B. This makes it possible to more accurately and efficiently specify the direction information and the shape information about a thing held by the player or part of the player.

The skeleton information about the player may be acquired in the same manner as in FIGS. 21A and 21B, and the direction information about a thing held by the player or part of the player may be acquired based on the acquired skeleton information.

This makes it possible to generate an image in which a bullet is fired in the downward direction DLS when the joints C6 and C7 indicated by the skeleton information are positioned as shown in FIG. 21A, and fired in the upward direction DLS when the joints C6 and C7 are positioned as shown in FIG. 21B, for example. Therefore, the bullet trajectory direction can be specified by a simple process using the skeleton information, so that the process efficiency can be improved.

The skeleton information about the player may be acquired in the same manner as in FIGS. 21A and 21B, and the processing area of the image process for acquiring the hit calculation information may be set based on the acquired skeleton information. For example, when the player has held a thing, a processing area including the position of the hand of the player is set based on the skeleton information. The image process is performed on the depth information or the color image information corresponding to the processing area to specify the direction information and the shape information about the thing held by the player (or part of the player).

According to this configuration, since the processing area of the image process can be limited to a small area, the processing load can be reduced.

2.5 Detailed Process Example

Figure 24:
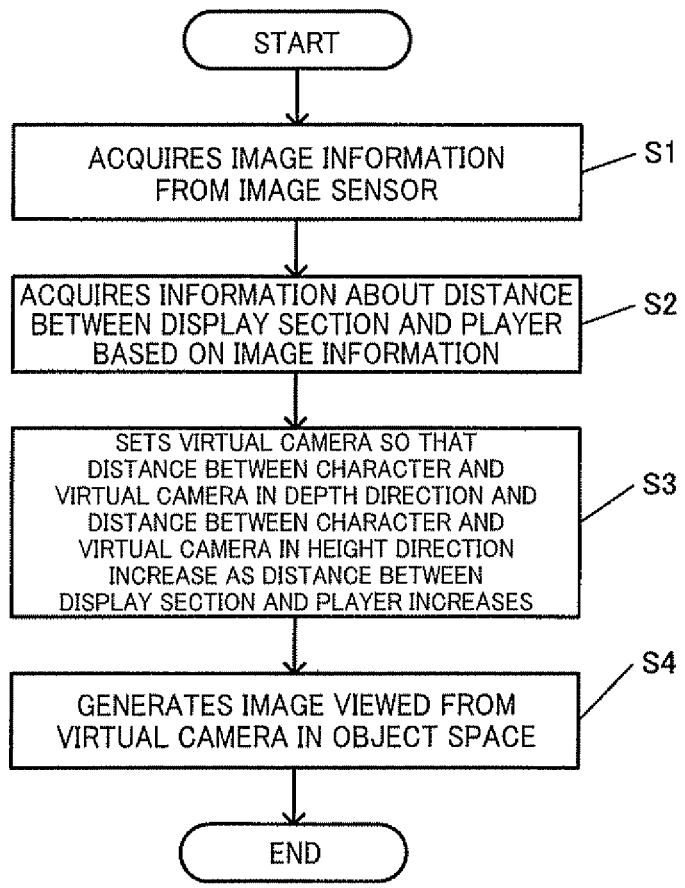
FIG. 24 is a flowchart illustrative of a process according to one embodiment of the invention.

A detailed process example according to this embodiment is described below using flowcharts shown in FIGS. 24 to 27. FIG. 24 is a flowchart showing a process that sets the distance between the character and the virtual camera in the depth direction and the like based on the information about the distance between the display section and the player, and generates an image.

The image information from the image sensor is acquired, as described with reference to FIGS. 2A and 2A (step S1). The information about the distance between the display section and the player is acquired based on the acquired image information (step S2).

The virtual camera is set so that the distance between the character and the virtual camera in the depth direction and the distance between the character and the virtual camera in the height direction increase as the distance between the display section and the player increases, as described with reference to FIGS. 3A to 5B (step S3). An image viewed from the virtual camera in the object space is then generated (step S4).

Figure 25:
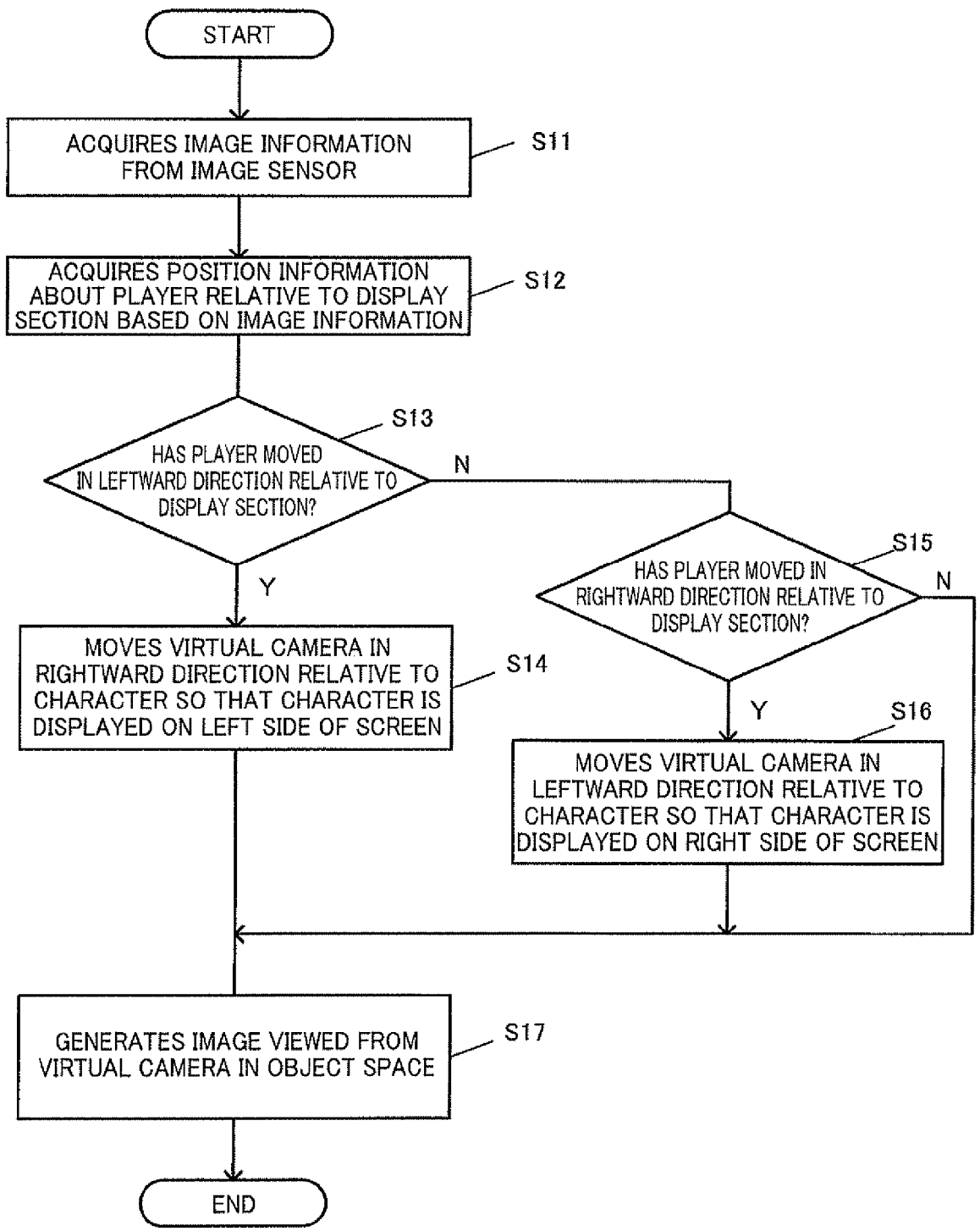
FIG. 25 is a flowchart illustrative of a process according to one embodiment of the invention.

FIG. 25 is a flowchart showing a process that sets the distance between the character and the virtual camera in the transverse direction based on the position information about the player.

The image information from the image sensor is acquired, and the position information about the player relative to the display section is then acquired (steps S11 and S12).

Whether or not the player has moved in the leftward direction relative to the display section is determined based on the acquired position information (step S13). When the player has moved in the leftward direction relative to the display section (see FIG. 8C), the virtual camera is moved in the rightward direction relative to the character (see FIG. 8D) so that the character is displayed on the left side of the screen (see FIG. 9) (step S14).

When it has been determined that the player has not moved in the leftward direction relative to the display section in the step S13, whether or not the player has moved in the rightward direction relative to the display section is determined (step S15). When the player has moved in the rightward direction relative to the display section, the virtual camera is moved in the leftward direction relative to the character so that the character is displayed on the right side of the screen (step S16). An image viewed from the virtual camera in the object space is then generated (step S17).

FIG. 26 is a flowchart showing a process that switches the viewpoint between a first-person viewpoint and a third-person viewpoint based on the information about the distance between the display section and the player.

The information about the distance between the display section and the player is acquired (step S21). Whether or not the distance between the display section and the player is equal to or shorter than a given distance is determined (step S22).

When the distance between the display section and the player is equal to or shorter than a given distance, the angle of view of the virtual camera is set to a narrow angle of view used for a first-person viewpoint (see FIGS. 12A and 12B) (step S23). In this case, the front clipping plane of the view volume is set at a position used for a first-person viewpoint, as described with reference to FIGS. 12A and 12B (step S25).

When it has been determined that the distance between the display section and the player is not equal to or shorter than a given distance in the step S22, the angle of view of the virtual camera is set to a wide angle of view used for a third-person viewpoint, as described with reference to FIG. 12C (step S24). An image viewed from the virtual camera in the object space is then generated (step S26).

FIG. 27 is a flowchart showing a process that changes a display image depending on whether the player has made a play motion with the right hand or the left hand.

The image information (e.g., color image information and depth information) is acquired by the image sensor (step S31). The skeleton information about the player is calculated using the depth information and the like, as described with reference to FIG. 14 (step S32).

Whether the player has made a play motion with the right hand or the left hand is determined based on the skeleton information (step S33). Whether or not the viewpoint has been set to a third-person viewpoint is then determined (step S34).

When the viewpoint has been set to a third-person viewpoint, whether or not the player has made a play motion with the right hand is determined (step S35). When the player has made a play motion with the right hand, a third-person viewpoint image in which the character is displayed on the left side of the screen is generated (see FIG. 15A) (step S36). When the player has made a play motion with the left hand, a third-person viewpoint image in which the character is displayed on the right side of the screen is generated (see FIG. 15B) (step S37).

When it has been determined that the viewpoint has been set to a first-person viewpoint in the step S34, whether or not the player has made a play motion with the right hand is determined (step S38). When the player has made a play motion with the right hand, a first-person viewpoint image in which the hand of the character or the like is displayed on the right side of the screen is generated (see FIG. 16A) (step S39). When the player has made a play motion with the left hand, a first-person viewpoint image in which the hand of the character or the like is displayed on the left side of the screen is generated (see FIG. 16B) (step S40).

Although some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term cited with a different term having a broader meaning or the same meaning at least once in the specification and the drawings can be replaced by the different term in any place in the specification and the drawings. The method of acquiring the position information about the player, the method of controlling the virtual camera based on the position information, the method of acquiring the skeleton information, the rendering method based on the rendering information, the hit calculation method based on the hit calculation information, and the like are not limited to those described in connection with the above embodiments. Methods equivalent to the above methods are also included within the scope of the invention. The invention may be applied to various games. The invention may also be applied to various image generation systems such as an arcade game system, a consumer game system, a large-scale attraction system in which a number of players participate, a simulator, a multimedia terminal, a system board that generates a game image, and a portable telephone.

What is claimed is:

1. An image generation system comprising:
   an image information acquisition section that acquires image information from an image sensor;
   an information acquisition section that acquires position information about a player relative to a display section that displays an image or the image sensor, based on the image information;
   a virtual camera control section that controls at least one of a distance between a character corresponding to the player and a virtual camera in a depth direction, a distance between the character and the virtual camera in a height direction, a distance between the character and the virtual camera in a transverse direction, and an angle of view of the virtual camera, based on the position information about the player acquired by the information acquisition section; and an image generation section that generates an image viewed from the virtual camera in an object space, wherein the virtual camera control section moves the virtual camera when the player has moved in one of a leftward direction and a rightward direction relative to the display section or the image sensor, the virtual camera being moved in the other of the leftward direction and the rightward direction relative to the character.

2. The image generation system as defined in claim 1, wherein the virtual camera control section increases the distance between the character and the virtual camera in the depth direction as a distance between the display section or the image sensor and the player increases.

3. The image generation system as defined in claim 1, wherein the virtual camera control section increases the distance between the character and the virtual camera in the height direction as a distance between the display section or the image sensor and the player increases.

4. The image generation system as defined in claim 1, wherein the virtual camera control section increases the angle of view of the virtual camera as a distance between the display section or the image sensor and the player increases.

5. The image generation system as defined in claim 1, wherein the virtual camera control section sets the virtual camera to a first-person viewpoint when a distance between the display section or the image sensor and the player is short, and sets the virtual camera to a third-person viewpoint when the distance between the display section or the image sensor and the player is long.

6. The image generation system as defined in claim 5, wherein the image generation section performs a clipping process that excludes at least part of the character from a drawing target when the virtual camera has been set to the first-person viewpoint by controlling the angle of view of the virtual camera.

7. The image generation system as defined in claim 1, wherein the image information acquisition section acquires depth information as the image information from the image sensor, a depth value being set to each pixel position of the depth information; and the information acquisition section acquires the position information about the player based on the depth information.

8. The image generation system as defined in claim 1, wherein the information acquisition section performs an image process based on the image information from the image sensor, and acquires at least one of direction information, color information, and shape information about a thing held by the player or part of the player as rendering information; and the image generation section performs a rendering process based on the rendering information that is at least one of the direction information, the color information, and the shape information to generate the image.

9. The image generation system as defined in claim 1, further comprising:

a hit calculation section that performs a hit calculation process, the information acquisition section performing an image process based on the image information from the image sensor, and acquiring at least one of direction information and shape information about a thing held by the player or part of the player as hit calculation information; and the hit calculation section performing the hit calculation process based on the hit calculation information acquired by the information acquisition section.

10. An image generation system comprising:

an image information acquisition section that acquires image information from an image sensor;

an information acquisition section that acquires position information about a player relative to a display section that displays an image or the image sensor, based on the image information;

a virtual camera control section that controls a virtual camera by being configured to adjust a position and/or rotational angle of the virtual camera, and that controls at least one of a distance between a character corresponding to the player and the virtual camera in a depth direction, a distance between the character and the virtual camera in a height direction, a distance between the character and the virtual camera in a transverse direction, and an angle of view of the virtual camera, based on the position information about the player acquired by the information acquisition section;

a determination section that determines whether the player has made a play motion with a right hand or a left hand; and an image generation section that generates an image viewed from the virtual camera in an object space, and generates a different image based on whether the player has made the play motion with the right hand or the left hand.

11. The image generation system as defined in claim 10, wherein the information acquisition section acquires skeleton information that specifies a motion of the player viewed from the image sensor based on the image information from the image sensor; and the determination section determines whether the player has made the play motion with the right hand or the left hand based on the skeleton information.

12. The image generation system as defined in claim 10, wherein the image generation section generates an image in which the character is displayed on a left side of a screen of the display section when the determination section has determined that the player has made the play motion with the right hand when the virtual camera is set to a third-person viewpoint, and generates an image in which the character is displayed on a right side of the screen of the display section when the determination section has determined that the player has made the play motion with the left hand when the virtual camera is set to the third-person viewpoint.

13. The image generation system as defined in claim 10, wherein the image generation section generates an image in which part of the character is displayed on a right side of a screen of the display section when the determination section has determined that the player has made the play motion with the right hand when the virtual camera is set to a first-person viewpoint, and generates an image in which part of the character is displayed on a left side of the screen of the display section when the determination section has determined that the player has made the play motion with the left hand when the virtual camera is set to the first-person viewpoint.

14. An image generation system comprising:
an information acquisition section that acquires information about a distance between a display section that displays an image and a player;
a virtual camera control section that controls a virtual camera by being configured to adjust a position and/or rotational angle of the virtual camera; and
an image generation section that generates an image viewed from the virtual camera in an object space,
the virtual camera control section increasing a distance between a character corresponding to the player and the virtual camera in a depth direction, or increasing an angle of view of the virtual camera, as the distance between the display section and the player increases.

15. An image generation system comprising:
an information acquisition section that acquires information about a distance between a display section that displays an image and a player;
a virtual camera control section that controls a virtual camera; and
an image generation section that generates an image viewed from the virtual camera in an object space,
the virtual camera control section setting the virtual camera to a first-person viewpoint when the distance between the display section and the player is short, and setting the virtual camera to a third-person viewpoint when the distance between the display section and the player is long.

16. An image generation method comprising:
acquiring image information from an image sensor;
acquiring position information about a player relative to a display section that displays an image or the image sensor based on the image information;
controlling at least one of a distance between a character corresponding to the player and a virtual camera in a depth direction, a distance between the character and the virtual camera in a height direction, a distance between the character and the virtual camera in a transverse direction, and an angle of view of the virtual camera, based on the position information about the player; and
generating an image viewed from the virtual camera in an object space, wherein
the controlling step moves the virtual camera when the player has moved in one of a leftward direction and a rightward direction relative to the display section or the image sensor, the virtual camera being moved in the other of the leftward direction and the rightward direction relative to the character.

17. An image generation method comprising:
acquiring information about a distance between a display section that displays an image and a player;
controlling a virtual camera by being configured to adjust a position and/or rotational angle of the virtual camera;
generating an image viewed from the virtual camera in an object space; and
increasing a distance between a character corresponding to the player and the virtual camera in a depth direction, or increasing an angle of view of the virtual camera, as the distance between the display section and the player increases.

18. An image generation method comprising:
acquiring information about a distance between a display section that displays an image and a player;
controlling a virtual camera;
generating an image viewed from the virtual camera in an object space; and
setting the virtual camera to a first-person viewpoint when the distance between the display section and the player is short, and setting the virtual camera to a third-person viewpoint when the distance between the display section and the player is long.

19. A non-transitory computer-readable information storage medium storing a program that causes a computer to execute an image generation method comprising:
acquiring image information from an image sensor;
acquiring position information about a player relative to a display section that displays an image or the image sensor based on the image information;
controlling at least one of a distance between a character corresponding to the player and a virtual camera in a depth direction, a distance between the character and the virtual camera in a height direction, a distance between the character and the virtual camera in a transverse direction, and an angle of view of the virtual camera, based on the position information about the player; and
generating an image viewed from the virtual camera in an object space, wherein
the controlling step moves the virtual camera when the player has moved in one of a leftward direction and a rightward direction relative to the display section or the image sensor, the virtual camera being moved in the other of the leftward direction and the rightward direction relative to the character.

20. A non-transitory computer-readable information storage medium storing a program that causes a computer to execute an image generation method comprising:
acquiring information about a distance between a display section that displays an image and a player;
controlling a virtual camera by being configured to adjust a position and/or rotational angle of the virtual camera;
generating an image viewed from the virtual camera in an object space; and
increasing a distance between a character corresponding to the player and the virtual camera in a depth direction, or increasing an angle of view of the virtual camera, as the distance between the display section and the player increases.

21. A non-transitory computer-readable information storage medium storing a program that causes a computer to execute an image generation method comprising:
acquiring information about a distance between a display section that displays an image and a player;
controlling a virtual camera;
generating an image viewed from the virtual camera in an object space; and
setting the virtual camera to a first-person viewpoint when the distance between the display section and the player is short, and setting the virtual camera to a third-person viewpoint when the distance between the display section and the player is long.

22. An image generation method comprising:
acquiring image information from an image sensor;

acquiring position information about a player relative to a display section that displays an image or the image sensor based on the image information;
controlling a virtual camera by being configured to adjust a position and/or rotational angle of the virtual camera;
controlling at least one of a distance between a character corresponding to the player and the virtual camera in a depth direction, a distance between the character and the virtual camera in a height direction, a distance between the character and the virtual camera in a transverse direction, and an angle of view of the virtual camera, based on the position information about the player;
determining whether the player has made a play motion with a right hand or a left hand; and
generating an image viewed from the virtual camera in an object space, wherein
the generating step generates a different image based on whether the player has made the play motion with the right hand or the left hand.

23. A non-transitory computer-readable information storage medium storing a program that causes a computer to execute an image generation method comprising:

acquiring image information from an image sensor;
acquiring position information about a player relative to a display section that displays an image or the image sensor based on the image information;
controlling a virtual camera by being configured to adjust a position and/or rotational angle of the virtual camera;
controlling at least one of a distance between a character corresponding to the player and the virtual camera in a depth direction, a distance between the character and the virtual camera in a height direction, a distance between the character and the virtual camera in a transverse direction, and an angle of view of the virtual camera, based on the position information about the player;
determining whether the player has made a play motion with a right hand or a left hand; and
generating an image viewed from the virtual camera in an object space, wherein
the generating step generates a different image based on whether the player has made the play motion with the right hand or the left hand.

* * * * *